US012622544B2

(12) United States Patent
Smith et al.

(10) Patent No.: US 12,622,544 B2
(45) Date of Patent: \*May 12, 2026

(54) COOKING DEVICE WITH A CONTROL LINKAGE

(71) Applicant: SharkNinja Operating LLC, Needham, MA (US)

(72) Inventors: Simon Christopher Smith, Essex (GB); Samuel Benjamin Baldry, Northhamptonshire (GB); Christina J. Crowley, London (GB); Tong Cui, Suzhou (CN)

(73) Assignee: SharkNinja Operating LLC, Needham, MA (US)

( * ) Notice: Subject to any disclaimer, the term of this patent is extended or adjusted under 35 U.S.C. 154(b) by 337 days.

This patent is subject to a terminal disclaimer.

(21) Appl. No.: 18/318,259

(22) Filed: May 16, 2023

(65) Prior Publication Data

US 2024/0237850 A1 Jul. 18, 2024

Related U.S. Application Data

(63) Continuation of application No. 18/156,066, filed on Jan. 18, 2023, now Pat. No. 11,882,961.

(51) Int. Cl.
| *A47J 36/06* | (2006.01) |
| *A47J 27/00* | (2006.01) |
| *A47J 37/06* | (2006.01) |

(52) U.S. Cl.
CPC ............. *A47J 36/06* (2013.01); *A47J 27/004* (2013.01); *A47J 37/0676* (2013.01)

(58) Field of Classification Search
None
See application file for complete search history.

(56) References Cited

U.S. PATENT DOCUMENTS

| 850,058 A | * | 4/1907 | Ross | ...................... A47J 37/10 |
| | | | | 99/425 |
| 895,433 A | * | 8/1908 | Conway | .................. A47J 37/10 |
| | | | | 126/41 R |

(Continued)

FOREIGN PATENT DOCUMENTS

| CN | 105025764 B | 7/2017 |
| CN | 107088001 A | 8/2017 |

(Continued)

OTHER PUBLICATIONS

CN 109998388 A (Zhuang, Xing et al.) Jul. 12, 2019 [retrieved on Jun. 14, 2025]. Retrieved from Foreign Image and Text database, translation by Clarivate Analytics. (Year: 2019).*

(Continued)

*Primary Examiner* — John J Norton

(74) *Attorney, Agent, or Firm* — Mintz, Levin, Cohn, Ferris, Glovsky and Popeo, P.C. US

(57) ABSTRACT

A cooking device is provided. In one embodiment, the cooking device includes a base having a recessed cavity arranged in a top surface. The cooking device can also include a heating element arranged within the recessed cavity of the base. A first bracket can be positioned on the base, and a cooking plate can be positioned on the top surface of the base. A lid assembly can be provided and can include a cover plate configured to be removably positioned over the cooking plate. The cover plate can include a plurality of through-holes arranged therein. A second bracket can be positioned on the cover plate and it can be configured to couple to the first bracket such that the lid assembly is connected to and rotatable relative to the base.

18 Claims, 36 Drawing Sheets

(56) References Cited

U.S. PATENT DOCUMENTS

| | | | |
|---|---|---|---|
| 3,407,723 A * | 10/1968 | Varkala | A47J 37/10 |
| | | | 99/425 |
| 4,178,500 A | 12/1979 | Brinkopke | |
| 5,062,408 A | 11/1991 | Smith et al. | |
| 5,606,905 A | 3/1997 | Boehm et al. | |
| 5,845,562 A | 12/1998 | Deni et al. | |
| 6,397,733 B1 | 6/2002 | Lin | |
| 6,415,710 B1 | 7/2002 | Boone | |
| 6,484,624 B1 | 11/2002 | Wu | |
| 6,603,099 B2 | 8/2003 | Gouthiere | |
| 6,718,866 B1 | 4/2004 | Robinson | |
| 6,736,131 B2 | 5/2004 | Yamamoto et al. | |
| 6,758,132 B1 | 7/2004 | Kuo et al. | |
| 6,845,707 B1 | 1/2005 | Xu et al. | |
| 6,917,017 B2 | 7/2005 | Moon et al. | |
| 6,995,340 B1 | 2/2006 | Ho | |
| 7,146,906 B2 | 12/2006 | Kuran | |
| 7,381,929 B2 | 6/2008 | Pedreno | |
| 7,415,922 B2 | 8/2008 | Cheng | |
| 7,475,630 B2 | 1/2009 | Steinberg et al. | |
| 7,506,579 B2 | 3/2009 | Worton et al. | |
| 7,640,929 B2 | 1/2010 | Johnson et al. | |
| 7,775,202 B2 | 8/2010 | Chen | |
| 8,006,685 B2 | 8/2011 | Bolton et al. | |
| 8,011,293 B2 | 9/2011 | Mcfadden et al. | |
| 8,151,698 B2 | 4/2012 | Mehta et al. | |
| 8,151,699 B2 | 4/2012 | Coutts | |
| 8,261,732 B2 | 9/2012 | Contarino, Jr. | |
| 8,299,404 B2 | 10/2012 | Van Der Weij | |
| 8,365,655 B2 | 2/2013 | Chen | |
| 8,424,449 B2 | 4/2013 | Lin et al. | |
| 8,618,447 B2 | 12/2013 | De' Longhi | |
| 8,646,381 B2 | 2/2014 | Donoho | |
| 8,720,324 B2 | 5/2014 | Coutts | |
| 8,752,479 B2 | 6/2014 | Sacherman et al. | |
| 8,761,588 B2 | 6/2014 | Lee | |
| 8,794,131 B2 | 8/2014 | Lai et al. | |
| 8,847,129 B2 | 9/2014 | Kim et al. | |
| 8,910,566 B2 | 12/2014 | Zhan | |
| 9,049,955 B2 | 6/2015 | Coutts | |
| 9,055,837 B2 | 6/2015 | Pai | |
| 9,226,613 B2 | 1/2016 | Cursoux et al. | |
| 9,301,644 B2 | 4/2016 | Payen et al. | |
| 9,307,864 B2 | 4/2016 | Li | |
| 9,341,382 B2 | 5/2016 | Kim | |
| 9,351,495 B2 | 5/2016 | Mcfadden | |
| 9,353,954 B2 | 5/2016 | Linnewiel | |
| 9,357,879 B2 | 6/2016 | Ortner et al. | |
| 9,468,334 B2 | 10/2016 | Liu et al. | |
| 9,526,374 B2 | 12/2016 | Kim | |
| 9,554,671 B2 | 1/2017 | Poon | |
| 9,565,971 B2 | 2/2017 | Fung et al. | |
| 9,615,691 B2 | 4/2017 | Xiao | |
| 9,615,692 B2 | 4/2017 | Hoffmann et al. | |
| 9,615,694 B2 | 4/2017 | Yoshidome | |
| 9,629,499 B2 | 4/2017 | Kim | |
| 9,693,656 B2 | 7/2017 | Chen et al. | |
| 9,775,465 B2 | 10/2017 | Ahmed | |
| 9,782,039 B2 | 10/2017 | Ortner et al. | |
| 9,854,941 B2 | 1/2018 | Bonaccorso | |
| 9,867,499 B2 | 1/2018 | Mcnerney et al. | |
| 9,883,770 B2 | 2/2018 | Hunt et al. | |
| 9,888,811 B2 | 2/2018 | Zwanenburg et al. | |
| 9,895,721 B2 | 2/2018 | Menominee et al. | |
| 9,900,936 B2 | 2/2018 | Imm et al. | |
| 9,949,491 B2 | 4/2018 | Stecher | |
| 9,974,414 B2 | 5/2018 | Szczepaniak et al. | |
| 9,980,605 B2 | 5/2018 | De Haas et al. | |
| 10,051,995 B2 | 8/2018 | Buckley et al. | |
| 10,064,518 B2 | 9/2018 | Xiao et al. | |
| 10,117,546 B2 | 11/2018 | Le Grand | |
| 10,154,750 B2 | 12/2018 | Allemand et al. | |
| 10,238,133 B2 | 3/2019 | Kallos | |
| 10,258,049 B2 | 4/2019 | Engstrom | |
| 10,260,758 B2 | 4/2019 | Colozzo et al. | |
| 10,260,759 B2 | 4/2019 | Colozzo et al. | |
| 10,264,917 B2 | 4/2019 | De Haas et al. | |
| 10,264,919 B2 | 4/2019 | Wenzel et al. | |
| 10,292,533 B2 | 5/2019 | Delrue et al. | |
| 10,307,018 B2 | 6/2019 | Van Der Burg et al. | |
| 10,327,588 B2 | 6/2019 | Dahle et al. | |
| 10,330,323 B2 | 6/2019 | Kim et al. | |
| 10,349,776 B2 | 7/2019 | Reischmann et al. | |
| 10,362,901 B2 | 7/2019 | Zwanenburg et al. | |
| 10,368,403 B2 | 7/2019 | Hayashi et al. | |
| 10,376,096 B2 | 8/2019 | Ogawa et al. | |
| 10,383,182 B2 | 8/2019 | Vainionpää | |
| 10,383,477 B2 | 8/2019 | Payen et al. | |
| 10,390,657 B2 | 8/2019 | Taga | |
| 10,405,696 B2 | 9/2019 | Kim | |
| 10,412,787 B2 | 9/2019 | Lee | |
| 10,448,785 B2 | 10/2019 | Van Der Weij | |
| 10,448,786 B2 | 10/2019 | Van Der Burg et al. | |
| 10,455,979 B2 | 10/2019 | Colston et al. | |
| 10,485,377 B2 | 11/2019 | Glucksman | |
| 10,492,642 B2 | 12/2019 | Seurat | |
| 10,492,643 B2 | 12/2019 | Joyce | |
| 10,499,760 B2 | 12/2019 | Blond | |
| 10,512,361 B2 | 12/2019 | To et al. | |
| 10,517,433 B2 | 12/2019 | Sladecek et al. | |
| 10,520,202 B2 | 12/2019 | Delrue et al. | |
| 10,561,277 B1 | 2/2020 | Swayne et al. | |
| 10,575,679 B1 | 3/2020 | Cheng et al. | |
| 10,578,317 B2 | 3/2020 | Deng et al. | |
| 10,638,882 B1 | 5/2020 | He et al. | |
| 10,646,069 B2 | 5/2020 | Bonaccorso | |
| 10,653,271 B2 | 5/2020 | Seymour | |
| 10,660,471 B2 | 5/2020 | Kim et al. | |
| 10,690,352 B2 | 6/2020 | Smith et al. | |
| 10,722,071 B2 | 7/2020 | De' Longhi et al. | |
| 10,729,282 B2 | 8/2020 | Bonaccorso | |
| 10,746,412 B1 | 8/2020 | Artt | |
| 10,813,491 B2 | 10/2020 | Delrue et al. | |
| 10,813,494 B2 | 10/2020 | Eberhart et al. | |
| 10,823,429 B2 | 11/2020 | Best | |
| 10,837,651 B2 | 11/2020 | Bruin-Slot et al. | |
| 10,842,316 B2 | 11/2020 | Sladecek et al. | |
| 10,849,463 B2 | 12/2020 | De' Longhi et al. | |
| 10,881,246 B2 | 1/2021 | He et al. | |
| 10,898,029 B2 | 1/2021 | Fung et al. | |
| 10,905,281 B2 | 2/2021 | Delrue et al. | |
| 10,905,284 B2 | 2/2021 | De' Longhi et al. | |
| 10,912,412 B2 | 2/2021 | Thunga | |
| 10,932,619 B2 | 3/2021 | Zhang et al. | |
| 10,952,565 B2 | 3/2021 | Shirali et al. | |
| 10,959,571 B2 | 3/2021 | Floessholzer | |
| 10,966,568 B2 | 4/2021 | Sladecek | |
| 10,973,250 B2 | 4/2021 | De Winter et al. | |
| 10,973,369 B2 | 4/2021 | Zhang | |
| 10,986,959 B2 | 4/2021 | Ganglin et al. | |
| 11,006,781 B2 | 5/2021 | Te Velde et al. | |
| 11,013,366 B2 | 5/2021 | Chuang et al. | |
| 11,033,145 B2 | 6/2021 | Conte et al. | |
| 11,045,044 B2 | 6/2021 | De' Longhi | |
| 11,045,047 B2 | 6/2021 | Popeil et al. | |
| 11,051,654 B2 | 7/2021 | Anthony et al. | |
| 11,076,717 B2 | 8/2021 | Glucksman | |
| 11,092,344 B2 | 8/2021 | Colozzo et al. | |
| 11,096,520 B2 | 8/2021 | Muhr et al. | |
| 11,096,522 B2 | 8/2021 | Allemand et al. | |
| 11,116,359 B2 | 9/2021 | Chen et al. | |
| 11,160,421 B2 | 11/2021 | Prieto et al. | |
| 11,168,892 B2 | 11/2021 | Streitwieser et al. | |
| 11,179,002 B2 | 11/2021 | Lu | |
| 11,185,189 B2 | 11/2021 | Huang et al. | |
| 11,490,761 B1 | 11/2022 | Jackson et al. | |
| 2005/0045170 A1 | 3/2005 | Lerner | |
| 2006/0249506 A1 | 11/2006 | Robertson | |
| 2007/0017384 A1 * | 1/2007 | Serra | A47J 37/0611 |
| | | | 99/372 |
| 2008/0087269 A1 | 4/2008 | Kang | |
| 2010/0180776 A1 * | 7/2010 | Lin | A47J 37/0623 |
| | | | 99/422 |
| 2011/0095031 A1 | 4/2011 | Welk et al. | |

(56)                References Cited

U.S. PATENT DOCUMENTS

| | | |
|---|---|---|
| 2012/0042787 A1 | 2/2012 | Pai |
| 2015/0230659 A1* | 8/2015 | Hoare ................. A47J 37/0611 |
| | | 99/375 |
| 2016/0309941 A1 | 10/2016 | Minard |
| 2017/0135159 A1 | 5/2017 | Sorenson et al. |
| 2017/0231430 A1 | 8/2017 | Moon et al. |
| 2017/0319007 A1 | 11/2017 | Bowens et al. |
| 2017/0360255 A1 | 12/2017 | Karau |
| 2018/0035698 A1 | 2/2018 | Mcnerney et al. |
| 2018/0078089 A1 | 3/2018 | Sauer et al. |
| 2018/0177343 A1 | 6/2018 | Bonaccorso |
| 2018/0192823 A1 | 7/2018 | Nureddine |
| 2018/0220842 A1 | 8/2018 | Delrue et al. |
| 2018/0255971 A1 | 9/2018 | Moon et al. |
| 2018/0266697 A1 | 9/2018 | Dash et al. |
| 2018/0303285 A1 | 10/2018 | Cheng |
| 2018/0359823 A1 | 12/2018 | Shin et al. |
| 2019/0021142 A1 | 1/2019 | Mizuta et al. |
| 2019/0021546 A1 | 1/2019 | Tan et al. |
| 2019/0029467 A1 | 1/2019 | Zhao |
| 2019/0069719 A1 | 3/2019 | Huang et al. |
| 2019/0082885 A1 | 3/2019 | Te Velde |
| 2019/0142215 A1 | 5/2019 | Popeil et al. |
| 2019/0142217 A1 | 5/2019 | Sladecek |
| 2019/0142218 A1 | 5/2019 | Popeil et al. |
| 2019/0167038 A1 | 6/2019 | De' Longhi et al. |
| 2019/0174953 A1 | 6/2019 | De' Longhi et al. |
| 2019/0203946 A1 | 7/2019 | Van Zutphen et al. |
| 2019/0246835 A1 | 8/2019 | Tsai |
| 2019/0246836 A1 | 8/2019 | Du et al. |
| 2019/0254475 A1 | 8/2019 | Du et al. |
| 2019/0254479 A1 | 8/2019 | De' Longhi et al. |
| 2019/0269276 A1 | 9/2019 | Gvili |
| 2019/0282028 A1 | 9/2019 | Kim et al. |
| 2019/0290062 A1 | 9/2019 | Prieto et al. |
| 2019/0298105 A1 | 10/2019 | Floessholzer |
| 2019/0298106 A1 | 10/2019 | Cichosz |
| 2019/0307291 A1 | 10/2019 | De' Longhi et al. |
| 2019/0328175 A1 | 10/2019 | Bancroft |
| 2019/0343329 A1 | 11/2019 | De' Longhi et al. |
| 2019/0374059 A1 | 12/2019 | Samonigg et al. |
| 2019/0387921 A1 | 12/2019 | Lemberger et al. |
| 2019/0387922 A1 | 12/2019 | Jin et al. |
| 2020/0008615 A1 | 1/2020 | Dahle et al. |
| 2020/0008616 A1 | 1/2020 | Moon |
| 2020/0008621 A1 | 1/2020 | Choi |
| 2020/0022531 A1 | 1/2020 | Man |
| 2020/0029731 A1 | 1/2020 | Hunt |
| 2020/0033009 A1 | 1/2020 | Lee et al. |
| 2020/0053842 A1 | 2/2020 | Jeon et al. |
| 2020/0060471 A1 | 2/2020 | Van Der Weij |
| 2020/0060474 A1 | 2/2020 | Joyce |
| 2020/0080726 A1 | 3/2020 | Polster |
| 2020/0113380 A1 | 4/2020 | Lu |
| 2020/0113381 A1 | 4/2020 | Chang |
| 2020/0121129 A1 | 4/2020 | Wittig |
| 2020/0138239 A1 | 5/2020 | Gromowski et al. |
| 2020/0146497 A1 | 5/2020 | Shi et al. |
| 2020/0187708 A1 | 6/2020 | Samonigg et al. |
| 2020/0187710 A1 | 6/2020 | Guo et al. |
| 2020/0187711 A1 | 6/2020 | De' Longhi et al. |
| 2020/0205595 A1 | 7/2020 | He |
| 2020/0205596 A1 | 7/2020 | Chen |
| 2020/0205597 A1 | 7/2020 | Chen |
| 2020/0221900 A1 | 7/2020 | Itzkowitz |
| 2020/0229637 A1 | 7/2020 | Han et al. |
| 2020/0229639 A1 | 7/2020 | Swayne et al. |
| 2020/0229640 A1 | 7/2020 | Han et al. |
| 2020/0240647 A1 | 7/2020 | Itzkowitz et al. |
| 2020/0260907 A1 | 8/2020 | Lu et al. |
| 2020/0260909 A1 | 8/2020 | De' Longhi et al. |
| 2020/0268189 A1 | 8/2020 | Anthony |
| 2020/0278116 A1 | 9/2020 | Kobayashi et al. |
| 2020/0315389 A1 | 10/2020 | Stewart et al. |
| 2020/0329908 A1 | 10/2020 | Chen |
| 2020/0329909 A1 | 10/2020 | Conrad et al. |
| 2020/0337497 A1 | 10/2020 | Anthony et al. |
| 2020/0405087 A1 | 12/2020 | Pool et al. |
| 2021/0025597 A1 | 1/2021 | Bruin-Slot et al. |
| 2021/0315416 A1 | 10/2021 | Fullmer et al. |

FOREIGN PATENT DOCUMENTS

| | | | | |
|---|---|---|---|---|
| CN | 206518479 U | 9/2017 | | |
| CN | 108471909 A | 8/2018 | | |
| CN | 208031028 U | 11/2018 | | |
| CN | 109157113 A | 1/2019 | | |
| CN | 109394005 A | 3/2019 | | |
| CN | 109452857 A | 3/2019 | | |
| CN | 109952050 A | 6/2019 | | |
| CN | 109998388 A | * | 7/2019 | .............. A47J 37/10 |
| CN | 110101316 A | 8/2019 | | |
| CN | 110151002 A | 8/2019 | | |
| CN | 209300780 U | 8/2019 | | |
| CN | 209360444 U | 9/2019 | | |
| CN | 209750794 U | 12/2019 | | |
| CN | 110720846 A | 1/2020 | | |
| CN | 110786749 A | 2/2020 | | |
| CN | 110916524 A | 3/2020 | | |
| CN | 210276928 U | 4/2020 | | |
| CN | 111184453 A | 5/2020 | | |
| CN | 111214131 A | 6/2020 | | |
| CN | 111227668 A | 6/2020 | | |
| CN | 210673108 U | 6/2020 | | |
| CN | 210810486 U | 6/2020 | | |
| CN | 106998961 B | 8/2020 | | |
| CN | 211186926 U | 8/2020 | | |
| CN | 211212750 U | 8/2020 | | |
| CN | 211582730 U | 9/2020 | | |
| CN | 111772499 A | 10/2020 | | |
| CN | 211609354 U | 10/2020 | | |
| CN | 111657741 B | 3/2022 | | |
| DE | 202009014563 U1 | 3/2010 | | |
| DE | 102012222784 A1 | 6/2013 | | |
| DE | 202016104922 U1 | 9/2016 | | |
| EP | 1679024 A1 | 7/2006 | | |
| EP | 1870006 B1 | 5/2011 | | |
| EP | 2245971 B1 | 10/2012 | | |
| EP | 2316315 B1 | 9/2013 | | |
| EP | 2433530 B1 | 12/2014 | | |
| EP | 2768364 B1 | 9/2015 | | |
| EP | 3207840 A1 | 8/2017 | | |
| EP | 2557974 B1 | 5/2018 | | |
| EP | 2988637 B1 | 7/2018 | | |
| EP | 3471586 A1 | 4/2019 | | |
| EP | 3003107 B1 | 9/2019 | | |
| EP | 3140596 B1 | 9/2019 | | |
| EP | 3251565 B1 | 11/2019 | | |
| EP | 3636120 A1 | 4/2020 | | |
| EP | 3491980 A4 | 7/2020 | | |
| EP | 3702675 A1 | 9/2020 | | |
| EP | 3823505 A1 | 5/2021 | | |
| EP | 3135163 B1 | 7/2021 | | |
| EP | 3918962 A4 | 4/2022 | | |
| FR | 3083685 B1 | 3/2021 | | |
| GB | 2479384 A | 10/2011 | | |
| GB | 2485370 A | 5/2012 | | |
| GB | 2473114 B | 6/2013 | | |
| GB | 2469583 B | 8/2013 | | |
| JP | 2022524004 A | 4/2022 | | |
| KR | 20040010875 A | * | 2/2004 | .......... A47J 37/1271 |
| KR | 102109966 B1 | 5/2020 | | |
| RU | 2017132307 A | 4/2019 | | |
| TR | 201711383 A2 | 2/2019 | | |
| TW | I790066 B | 1/2023 | | |
| WO | WO-2015091114 A1 | * | 6/2015 | .............. G05G 1/08 |
| WO | 2017044598 A1 | 3/2017 | | |
| WO | 2019153512 A1 | 8/2019 | | |
| WO | 2019156417 A1 | 8/2019 | | |
| WO | 2019157848 A1 | 8/2019 | | |
| WO | 2019171404 A1 | 9/2019 | | |
| WO | 2019207325 A1 | 10/2019 | | |
| WO | 2019238605 A1 | 12/2019 | | |
| WO | 2019238794 A1 | 12/2019 | | |

(56)                        References Cited

FOREIGN PATENT DOCUMENTS

| | | | |
|---|---|---|---|
| WO | 2019243093 | A1 | 12/2019 |
| WO | 2019245108 | A1 | 12/2019 |
| WO | 2020016084 | A1 | 1/2020 |
| WO | 2020016085 | A1 | 1/2020 |
| WO | 2020032421 | A1 | 2/2020 |
| WO | 2020052010 | A1 | 3/2020 |
| WO | 2020072777 | A1 | 4/2020 |
| WO | 2020077762 | A1 | 4/2020 |
| WO | 2020093417 | A1 | 5/2020 |
| WO | 2020098748 | A1 | 5/2020 |
| WO | 2020098749 | A1 | 5/2020 |
| WO | 2020099355 | A1 | 5/2020 |
| WO | 2020108375 | A1 | 6/2020 |
| WO | 2020127334 | A1 | 6/2020 |
| WO | 2020134318 | A1 | 7/2020 |
| WO | 2020139853 | A1 | 7/2020 |
| WO | 2020148164 | A1 | 7/2020 |
| WO | 2020148187 | A1 | 7/2020 |
| WO | 2020149635 | A1 | 7/2020 |
| WO | 2020173841 | A1 | 9/2020 |
| WO | 2020177323 | A1 | 9/2020 |
| WO | 2020184785 | A1 | 9/2020 |

OTHER PUBLICATIONS

International Search Report and Written Opinion received for PCT
Application No. PCT/US2024/011763, mailed on Apr. 25, 2024, 12
pages.

\* cited by examiner

COOKING DEVICE WITH A CONTROL LINKAGE

CROSS-REFERENCE TO RELATED APPLICATIONS

This application is a continuation application of U.S. application Ser. No. 18/156,066, filed Jan. 18, 2023, and entitled "COVER PLATE FOR COOKING DEVICES," the contents of which are hereby incorporated by reference in their entirety.

FIELD

Cover plates for use with cooking devices are provided.

BACKGROUND

Various systems and methods for preventing grease from escaping a cooking surface, such as metal pot cover screens, are known. These systems typically include a fine mesh screen that not only prevents grease and food particulates from escaping the cooking surface, but also excessively traps moisture generated from the cooking process. The capture of excessive moisture leads to undesired results, since certain cooking processes, such as searing meat at a high temperature, requires removing moisture from the cooking space to allow a searing effect to occur, rather than a steaming effect. Existing cooking devices are typically designed to prevent the escape of grease and food particulates, and sacrifice moisture removal to achieve this.

SUMMARY

Cover plates and cooking device for use therewith are provided.

In one embodiment, a cooking device is provided having a base including a recessed cavity arranged in a top surface. The cooking device can also include a heating element arranged within the recessed cavity of the base. A first bracket can be positioned on the base, and a cooking plate can be positioned on the top surface of the base. A lid assembly can be provided and it can include a cover plate configured to be removably positioned over the cooking plate. The cover plate can include a plurality of through-holes arranged therein. A second bracket can be positioned on the cover plate and it can be configured to couple to the first bracket such that the lid assembly is connected to and rotatable relative to the base.

The base can have a variety of configurations. For example, in some embodiments, the first bracket can include at least one slot. The second bracket includes at least one projection configured to be removably positioned within the at least one slot of the first bracket.

In another embodiment, a gap can be formed between the heating element and the cooking plate arranged on the base. In another embodiment, the cooking plate can include a grease trap formed within the cooking plate. In another embodiment, the base can include a second recess configured to receive the grease trap of the cooking plate when arranged on the base.

The cover plate can also have a variety of configurations. In one embodiment, the cover plate can have a first zone having a first design pattern of through-holes, and a second zone having a second design pattern of through-holes. The first zone can have a greater percentage of open surface over the cooking plate than the second zone. In another embodiment, a percentage of open surface over the cooking plate created by the through-holes can be within a range of 10% to 30%. In another embodiment, the cover plate can include at least one spacer configured to prevent the cover plate from contacting the cooking plate. In another embodiment, the through-holes can be configured to allow moisture generated by a cooking process occurring on the cooking plate to pass through the cover plate while preventing food particulate and grease from passing there through.

In yet another embodiment, a lid assembly is provided and includes a cover plate configured to be removably positioned over a cooking plate. The cover plate can include a plurality of through-holes arranged therein. A bracket can be positioned on a rear surface of the cover plate, and the bracket can be configured to rotatably connect the cover plate to a base of a cooking device to position the cover plate over a cooking plate in the base. The through-holes can be configured to allow moisture generated by a cooking process occurring below the cover plate to pass through the cover plate while preventing food particulate and grease from passing therethrough.

The lid assembly can have a variety of configurations. For example, in some embodiments, the cover plate can include a first zone having a first design pattern of through-holes, and a second zone having a second design pattern of through-holes. In some aspects, the first zone can have a greater percentage of open surface over the cooking plate than the second zone. In another embodiment, a percentage of open surface over the cooking plate created by the through-holes can be within a range of 10% to 30%. In another embodiment, the through-holes can have a width within a range of 3 mm to 8 mm. In another embodiment, the cover plate can include at least one non-abrasive spacer.

In another embodiment, a cooking device is provided having a base including a first recessed cavity arranged in a top surface and a second recessed cavity arranged in the top surface. A heating element can be positioned within the first recessed cavity. A first bracket can be positioned on a rear surface of the base. The cooking device can also include a cover plate having a second bracket positioned on a rear surface of the cover plate. The second bracket can be configured to mate to the first bracket to rotatably connect the cover plate to the base. The cover plate can also include a plurality of through-holes arranged therein. A first cooking plate can be configured to be positioned on the top surface of the base, and a second cooking plate can be configured to be positioned on the top surface of the base. The second cooking plate can have a configuration that differs from a configuration of the first cooking plate.

The cooking device can have a variety of configurations. For example, in some embodiments, the first cooking plate can include a first grease trap formed within the first cooking plate, and the second cooking plate can include a second grease trap formed within the second cooking plate. In another embodiment, the second recessed cavity can be configured to receive the first grease trap when the first cooking plate is positioned on the base, and can be configured to receive the second grease trap when the second cooking plate is positioned on the base.

BRIEF DESCRIPTION OF THE DRAWINGS

These and other features will be more readily understood from the following detailed description taken in conjunction with the accompanying drawings, in which:

FIG. 15 is a front perspective view of the cooking device of FIG. 1 showing the lid assembly in an removal configuration;

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In general, when searing a food product such as protein, moisture is released from the food product. In addition to moisture being released, fats and other food particulates can be released onto the cooking surface, where there fluids and particles can splatter out of the cooking volume and onto the surrounding support surface. While it is desirable to keep fluids such as grease and food particulates from exiting the cooking volume, moisture must also be released from the cooking volume to allow a searing effect on food instead of a steaming effect, leading to an undesirable food texture.

Accordingly, a cooking device is provided having a cover plate that solves the aforementioned issues by including through-holes which are large enough to evacuate moisture from a cooking volume, but that still sufficiently retain grease and food particles during a cooking process.

Figure 1:
FIG. 1 is a front perspective view of one embodiment of a cooking device having a lid assembly coupled thereto.
Figure 1:
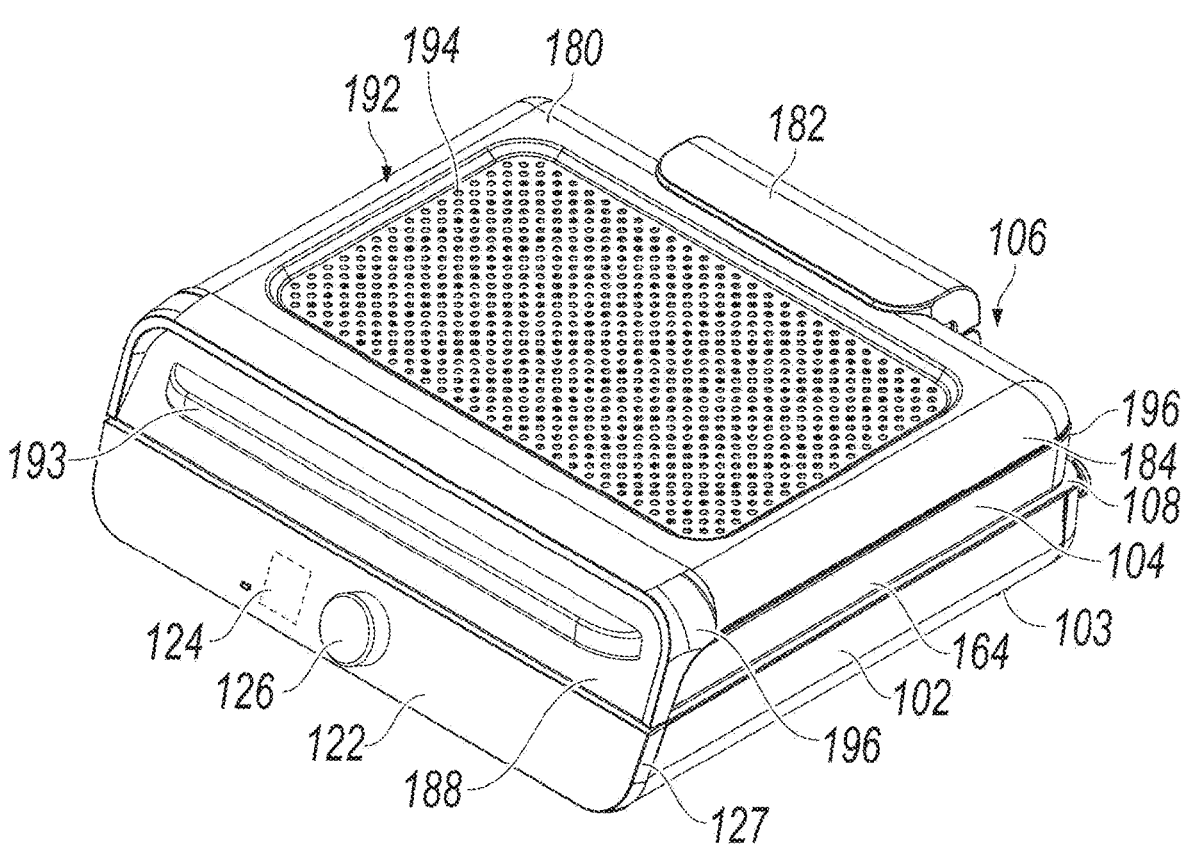
Figure 2:
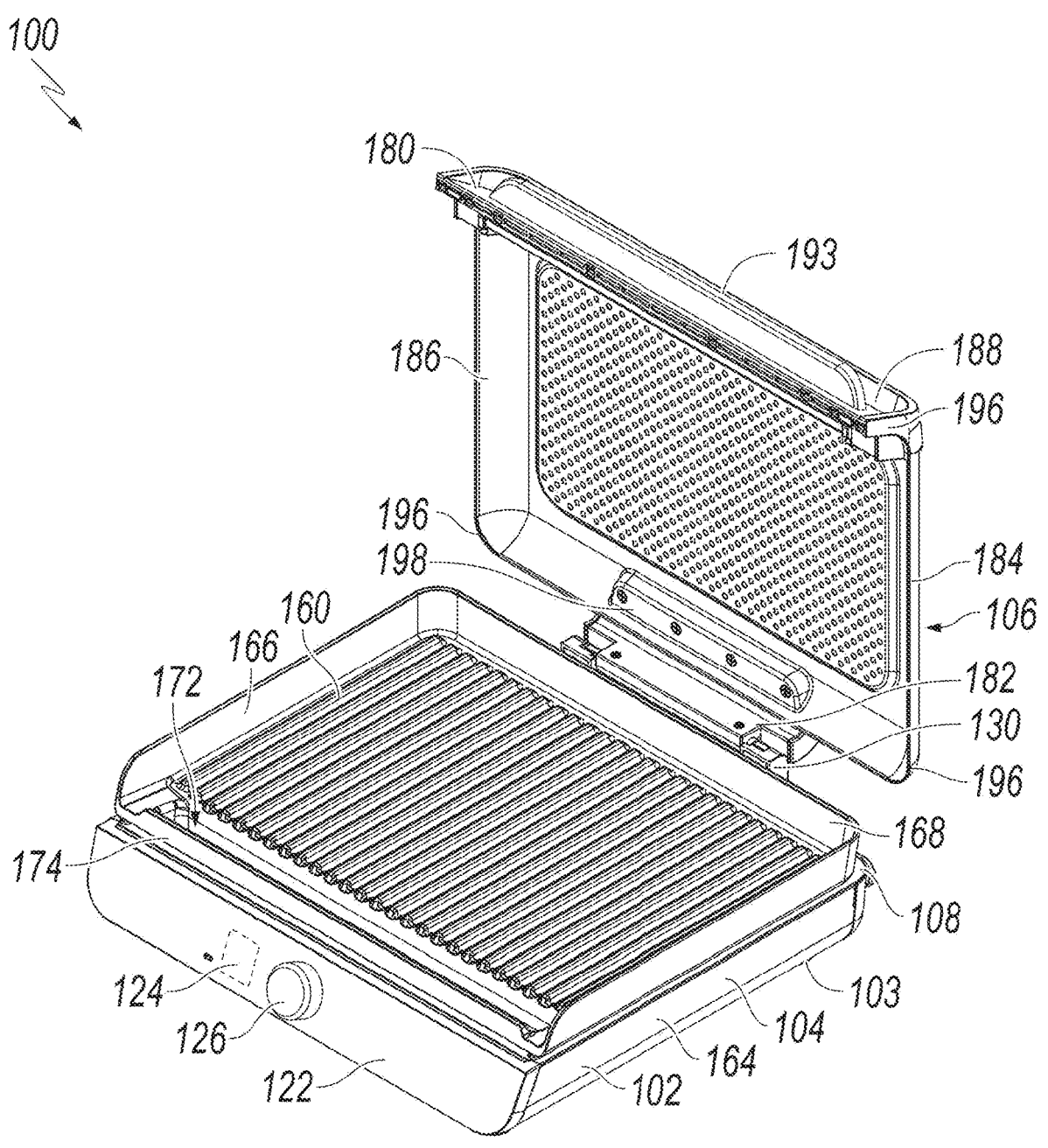
FIG. 2 is a front perspective view of the cooking device of FIG. 1 showing the lid assembly in an open configuration.
Figure 3:
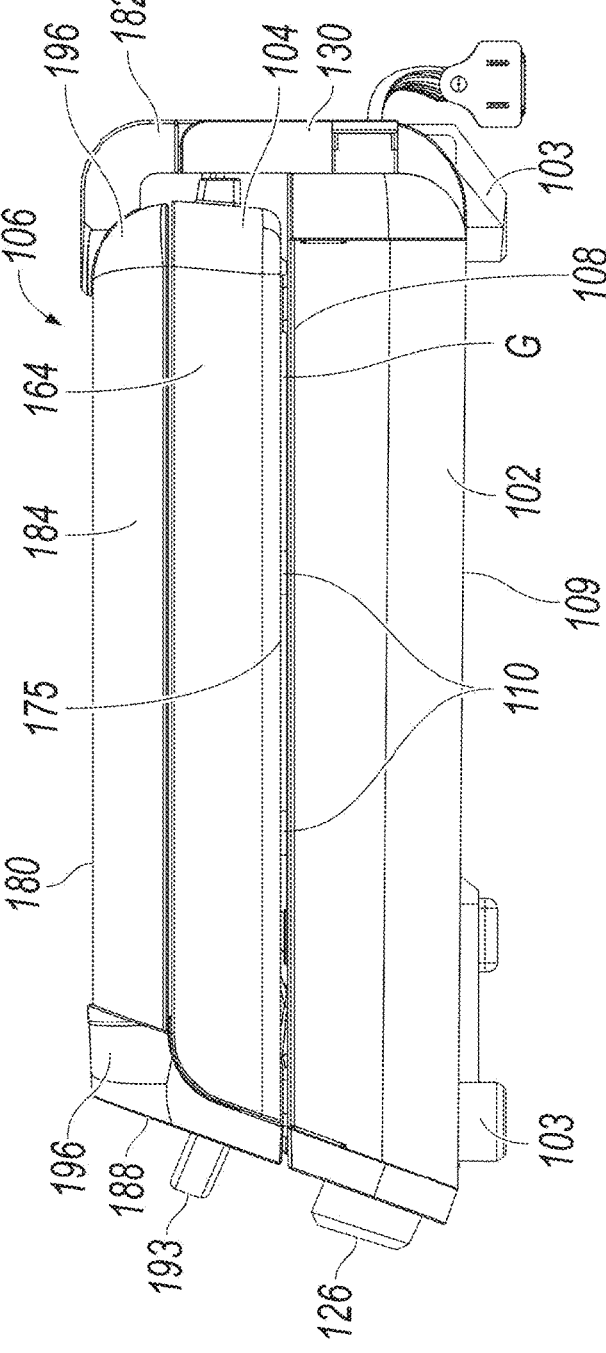
FIG. 3 is a side view of the cooking device of FIG. 1.
Figure 3:
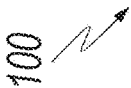

FIGS. 1-3 illustrate one embodiment of a cooking device 100 operable to prepare a food product and suitable for use on a support surface, such as a countertop. A person skilled in the art will appreciate that the lid assembly disclosed herein can be used with any cooking device, and the illustrated apparatus is merely provided as one example of an apparatus for use with a lid assembly. As shown, the cooking device 100 generally includes a base 102, a cooking plate 104, and a lid assembly 106. As explained in detail below, the base 102, cooking plate 104, and lid assembly 106 can be connected together to form the cooking device 100.

Figure 4:
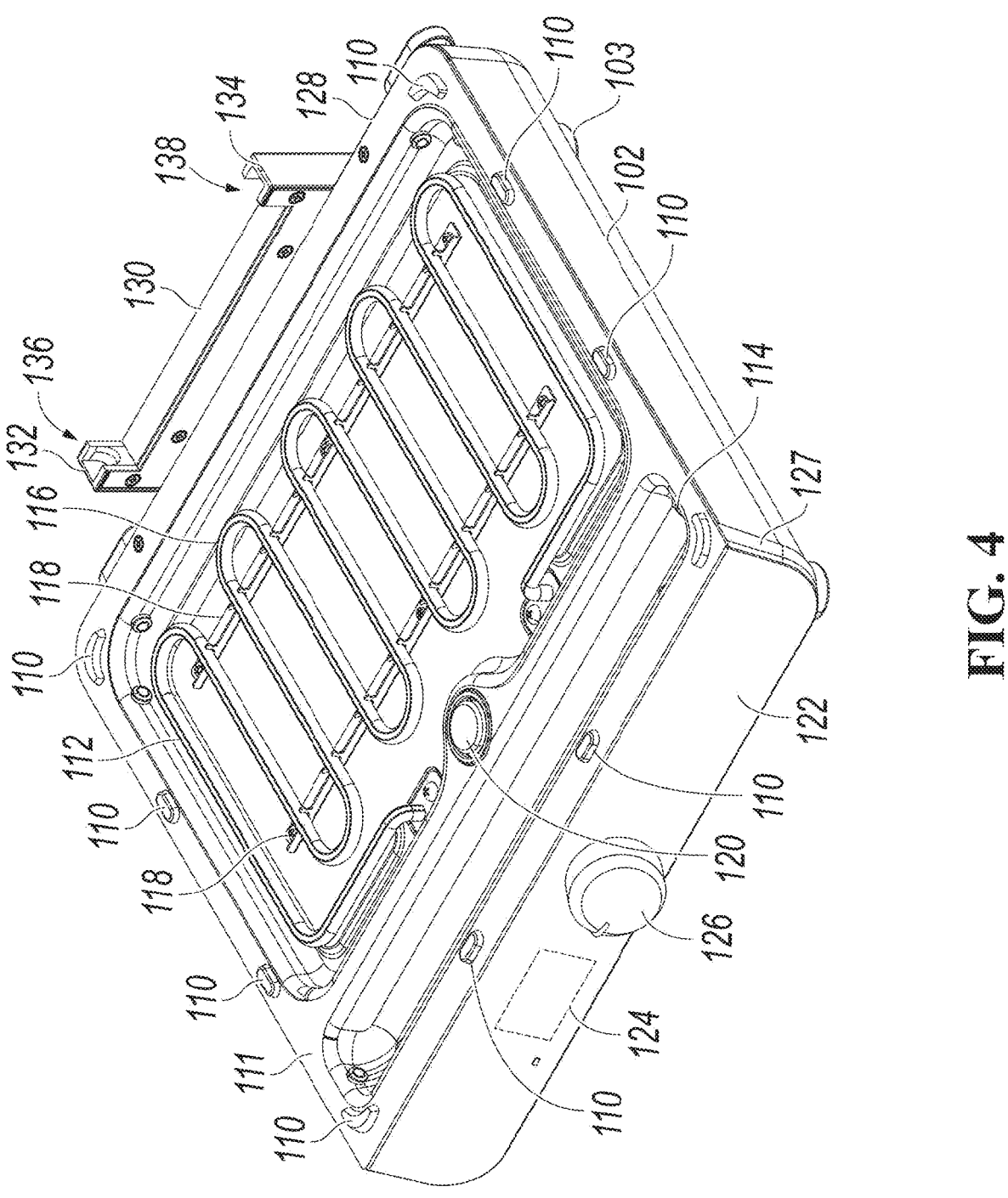
FIG. 4 is a top perspective view of the cooking device of FIG. 1 with the lid assembly and cooking plate removed from the cooking device.

The base 102 can have a variety of configurations, but in the illustrated embodiment it is configured to be positioned on a support surface, such as a countertop. As depicted in FIG. 4, the base 102 has a generally rectangular configuration and includes an upper surface 108 and a lower surface 109. Arranged on the upper surface 108 are projections 110 positioned about an outer rim 111 of the base 102. The projections 110 can be formed on or integral with the upper surface 108 and can be configured to support a cooking plate above the upper surface 108. As shown in FIG. 3, when a cooking plate is arranged on the base 102, a gap G is formed between the upper surface 108 of the base 102 and the bottom surface of the cooking plate.

As shown in FIG. 3, the lower surface 109 of the base 102 can include features to aid in positioning the base on a support surface, such as a countertop. In the illustrated embodiment, the lower surface 109 includes legs 103 arranged at the four corners of the base 102 in order to provide stability to the base 102 while resting on a support surface. The legs 103 can extend downward from the base 102 in order to raise the base 102 up off a support surface to prevent damage to the support surface during the cooking process. A person skilled in the art will appreciate that the legs can be positioned at various locations and can have a variety of other configurations, or in other embodiments the base can include other support features or need not include any support features.

As further shown in FIG. 4, the base 102 can include a first cavity 112 and a second cavity 114. Both the first cavity 112 and the second cavity 114 can be recessed into the upper surface 108 of the base 102. The first cavity 112 can have a generally rectangular configuration extending along substantially the whole width of the base 102. A heating element 116 can be arranged within the first cavity 112 and it can be configured to produce heat in order to allow cooking on a cooking plate arranged on the base 102, as will be described in greater detail below. In one embodiment, the heating element 116 can be a cal-rod having an "s-type" bend along the length and width of the recessed cavity 112 in order to ensure even heat distribution to a cooking plate. However, other types of heating elements, such as coils and combustion type heating elements, can be used and should be considered within the scope of this disclosure. Additionally, brackets 118 can be arranged within the cavity 112 in order to support the heating element 116 within the cavity 112.

Similar to the first cavity 112, the second cavity 114 is also recessed into the base 102. In one aspect, the second cavity 114 is configured to receive a grease trap of a cooking plate, as will be described in detail below. While the first cavity 112 and the second cavity 114 are shown as separate and distinct cavities, in one aspect both the first and second cavities 112, 114 can be a single recessed cavity in the base 102.

In order to control the heat produced by the heating element 116, a temperature sensor 120 can be arranged within the base 102. In the illustrated embodiment, the temperature sensor 120 is arranged between the first cavity 112 and the second cavity 114 and is centrally located along the width of the base 102. While the temperature sensor 120 is shown in a centrally located position, the temperature sensor 120 can be arranged at various other positions on the base 102. The temperature sensor 120 can be configured to extend upward past the upper surface 108 in order to contact a cooking plate arranged on the base 102. The temperature sensor 120 is configured to measure the temperature of the cooking plate while the heating element 116 is activated. In one aspect, the temperature sensor 120 can be a negative temperature coefficient (NTC) thermistor, or a thermostat. In another aspect, the temperature sensor 120 can be spring biased upward in order to ensure contact with the cooking plate.

In addition to use of the temperature sensor 120 in order to control the heating element 116, a control panel 122 can be arranged on the front surface 127 of the base 102. In the illustrated embodiment, the control panel 122 includes a user interface 124 and an input 126. The user interface 124 can be configured to display different operating modes and/or readings from the temperature sensor 120 while the cooking device 100 is in use. The input 126 can be configured to allow user to input different cooking parameters based on the desired cooking procedure, such as increasing or decreasing the temperature of the heating element 116. The input 126 can have a variety of configurations, such as a rotatable dial or button used to input different parameters. In one aspect, the control panel 122, temperature sensor 120, and heating element 116 can all be communicatively coupled to a control unit (not shown) which receives input from the control panel 122 and temperature sensor 120, and then controls the power input to the heating element 116 based on the inputs.

Figure 5A:
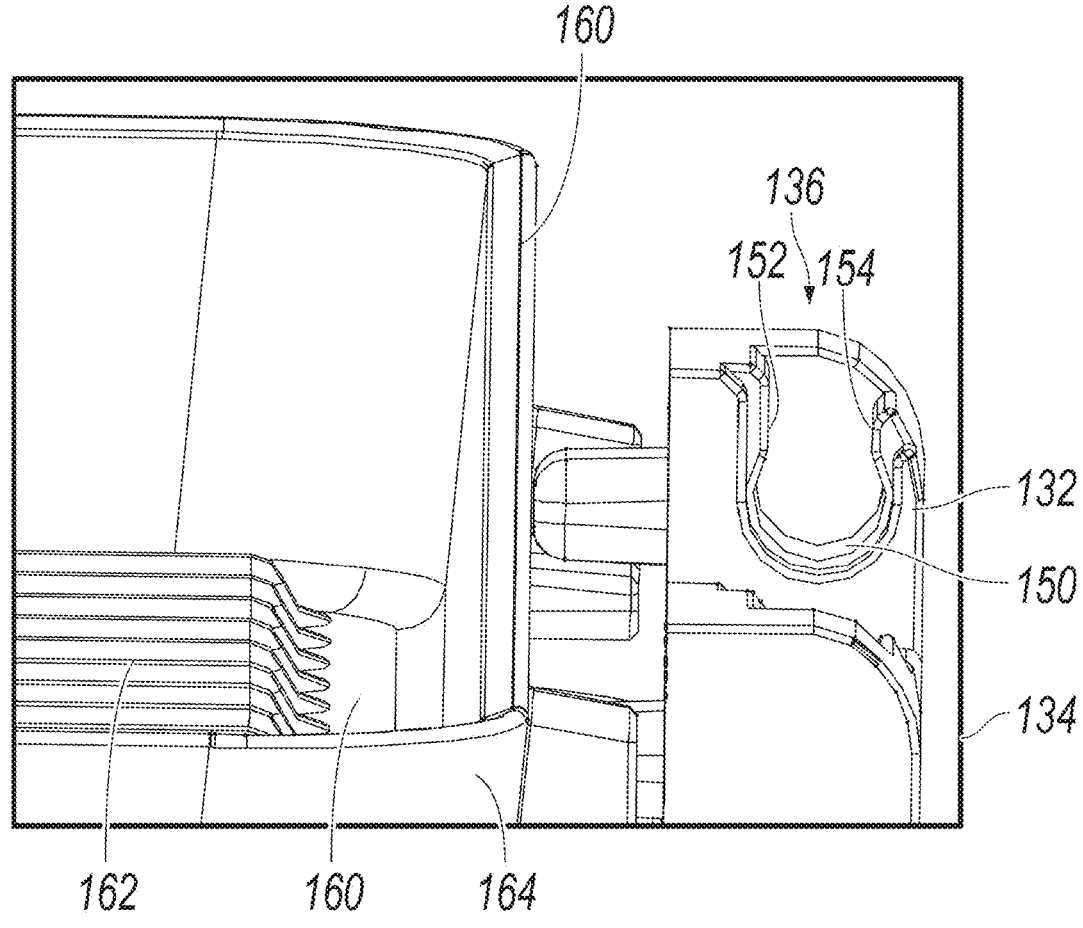
FIG. 5A is a detailed perspective view of a bracket of the cooking device of FIG. 1.
Figure 5B:
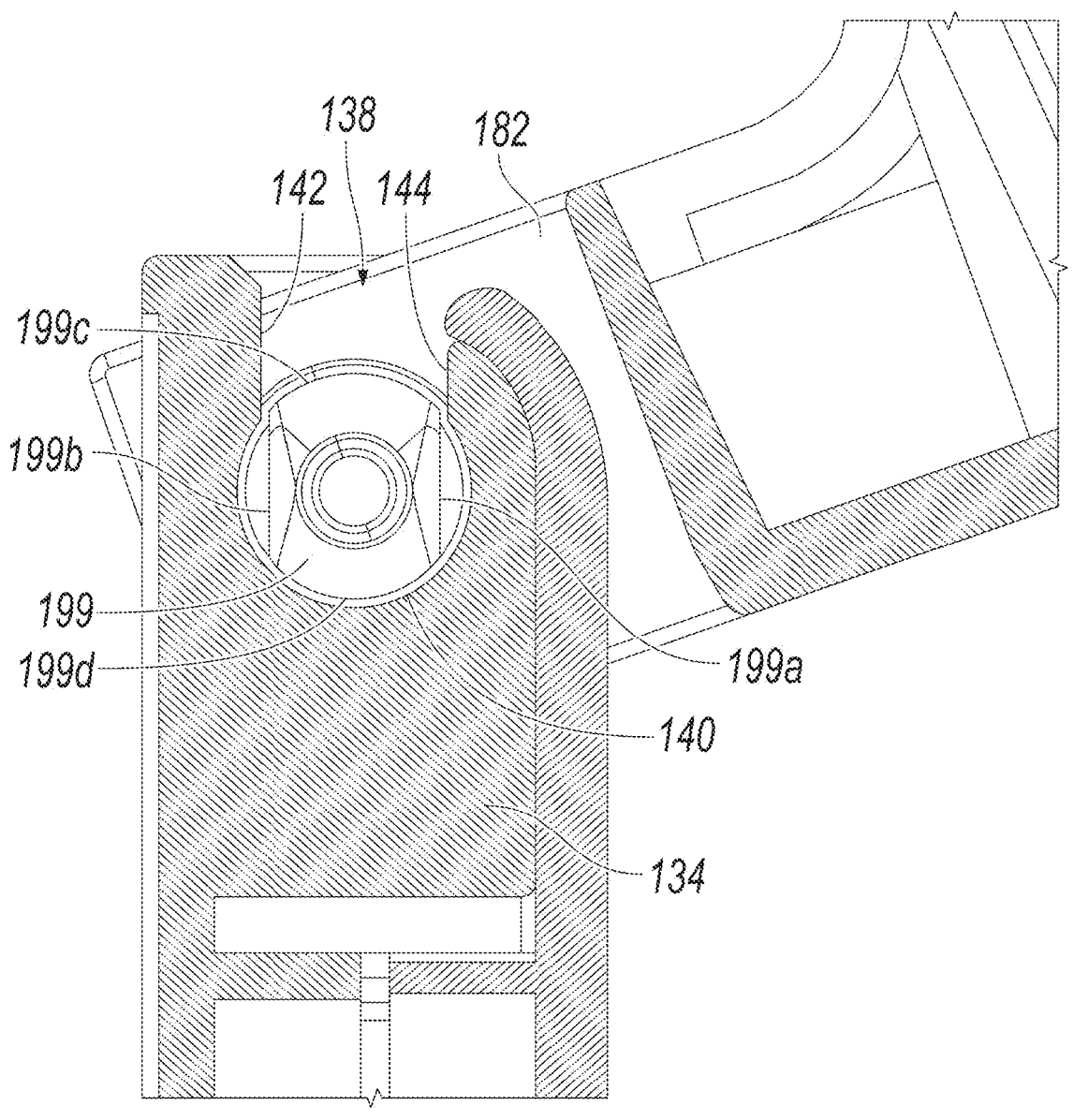
FIG. 5B is a detailed cross-sectional view of the rotational connection between the lid assembly and base of FIG. 1.
Figure 6:
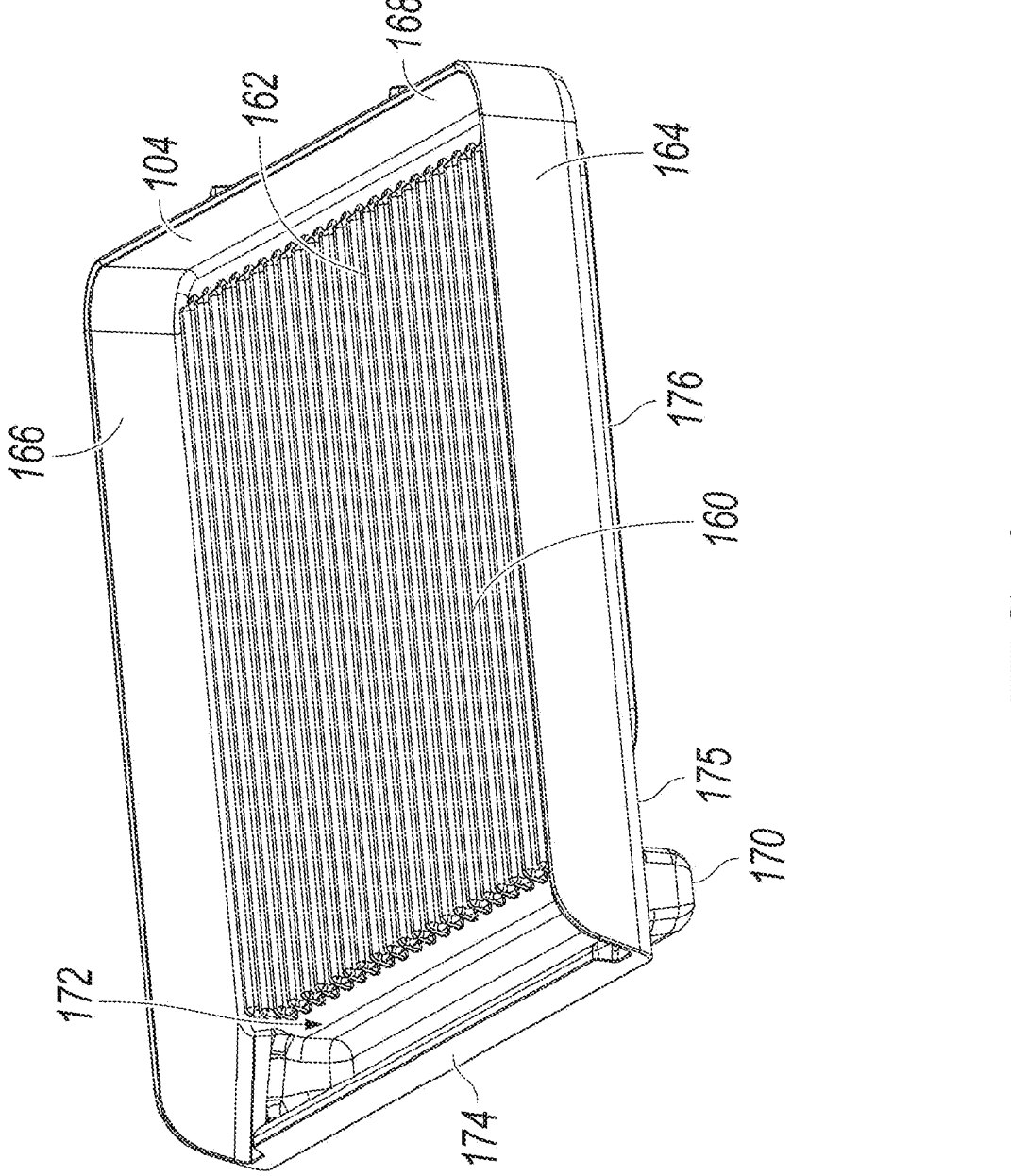
FIG. 6 is a top perspective view of a cooking plate of the cooking device of FIG. 2 removed from the cooking device.

As indicated above, the base 102 can include a bracket 130, which in the illustrated embodiment is positioned opposite the control panel 122. Specifically, the bracket 130 is arranged on a rear surface 128 of the base 102. The bracket 130 can be a separate component to the base 102, or can be integral with the base 102. The bracket 130 can extend upward from the base 102 above the upper surface 108. The illustrated bracket 130 is a U-shaped member which includes projections 132, 134 arranged on opposite sides of the bracket 130. Each projection 132, 134 can include a slot 136, 138 formed therein, respectively. Both slots 136, 138 can correspond to portions of a bracket arranged on a lid assembly, which will be described in greater detail below. As shown in FIG. 5A the slot 136 includes a circular cavity 150, and straight wall sections 152, 154. The diameter of the curved wall section 150 can be greater than the distance between the straight wall sections 152, 154. Slot 138 can have the same configuration, as shown in FIG. 5B.

As stated above, the base 102 is configured to support a cooking plate 104 such that the heating element 116 can produce heat to the cooking plate 104. As depicted in FIGS. 6-9, the cooking plate 104 can be configured to provide a cooking surface for food product. The illustrated cooking plate 104 is generally rectangular and is configured to rest on top of the base 102 in order to arrange the heating element 116 below the cooking surface 160. The cooking plate 104 generally includes a cooking surface 160, which is sized to correspond to a size of the base 102 and the heating element 116. In one aspect, the cooking surface 160 can include ribs 162 arranged along the cooking surface 160. Side walls 164, 166, and a rear sidewall 168 can surrounding the cooking surface 160. The sidewalls 164, 166, and 168 extend upward from the cooking surface 160 in order to retain food particulates and grease on the cooking plate 104 during the cooking process. In one embodiment, the cooking surface 160 can be slanted away from the rear sidewall 168 towards a grease trap 170. The grease trap 170 can be arranged at the front of the cooking plate 104, opposite the rear sidewall 168. The grease trap 170 can include an opening 172 that extends along substantially the whole width of the cooking plate 104. The grease trap 170 is configured to receive runoff fluids and food particulates produced during the cooking process in order to reduce the smoke generated on the cooking plate 104, by moving these fluids and food particulates away from the cooking surface 160 and heating element 116. A lip 174 can be arranged on the front edge of the cooking plate 104, and it can be configured to help contain grease, fluids, and food particulates within the cooking plate 104. The lip 174 can extend along the entire width of the grease trap opening 172 and it can be integral with the cooking plate 104.

Figure 7:
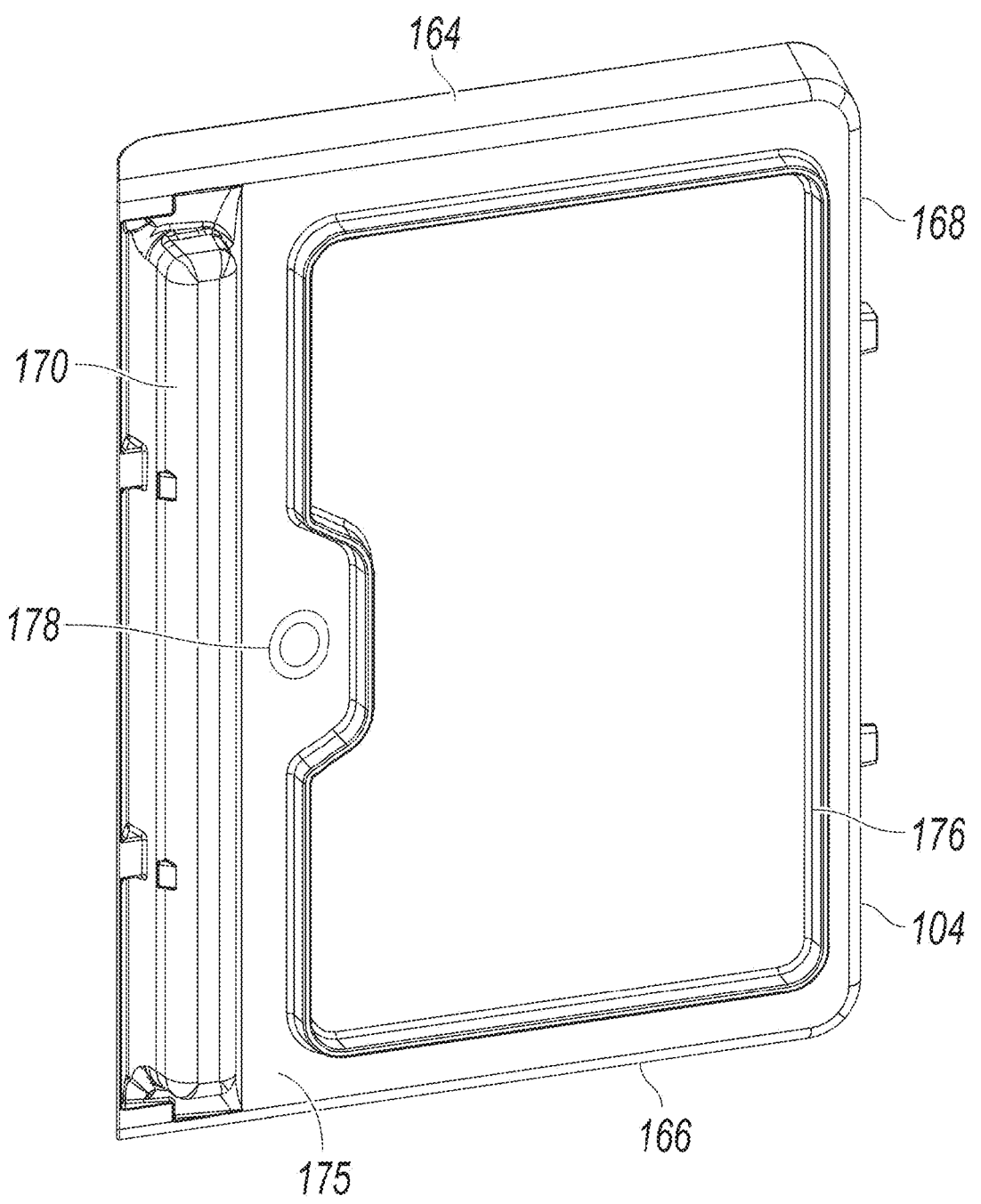
FIG. 7 is a bottom perspective view of the cooking plate of FIG. 6.
Figure 8:
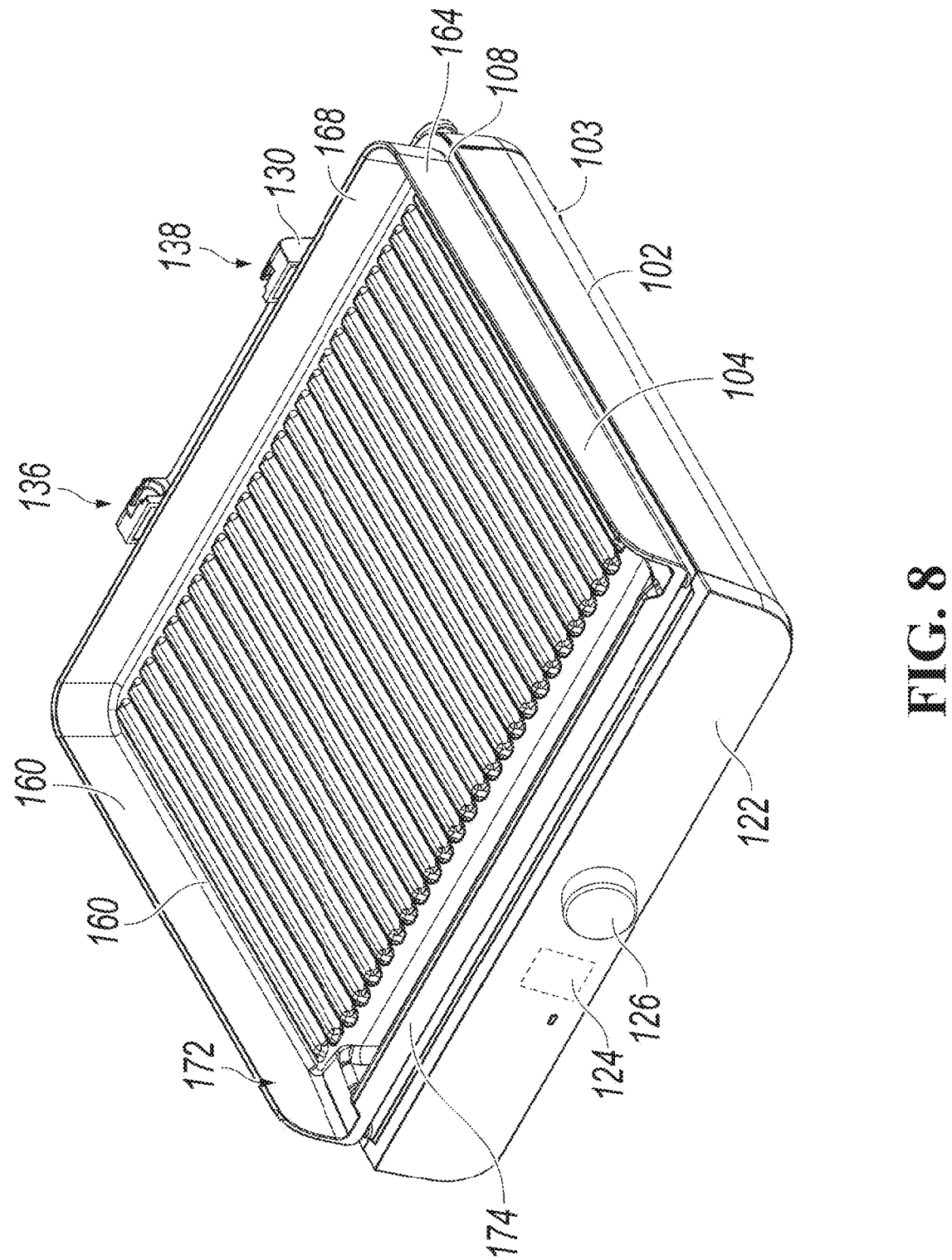
FIG. 8 is a top perspective view of the cooking device of FIG. 1 with the lid assembly removed from the cooking device.
Figure 9:
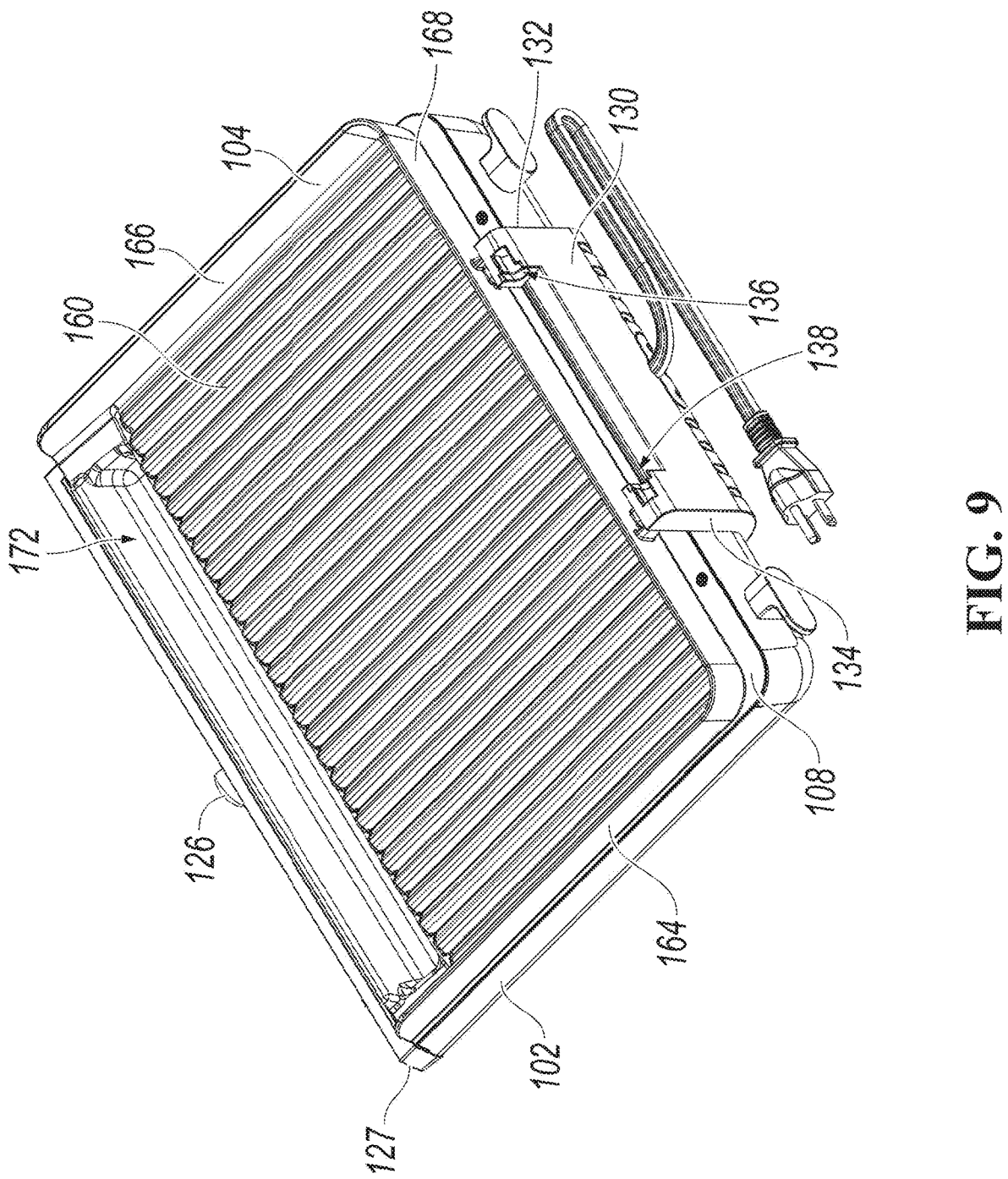
FIG. 9 is a rear perspective view of the cooking device of FIG. 8.

As further shown in FIG. 7, a support rib 176 can be arranged on a bottom surface 175 of the cooking plate 104. The support rib 176 can generally outline the cooking surface 160, and can partially extend downward into the recessed cavity 112 of the base 102. The support rib 176 can be configured to provide rigidity to the cooking plate 104 in order to prevent warping during the cooking process using the cooking plate 104. Additionally a sensor contact 178 can be arranged on the bottom surface 175 of the cooking plate 104. The sensor contact 178 is arranged between the grease trap 170 and the support rib 176 and is positioned at a location that corresponds to the location of the temperature sensor 120 in the base 102. The sensor contact 178 is configured to give the temperature sensor 120 a specific position to contact the cooking plate 104.

Figure 10:
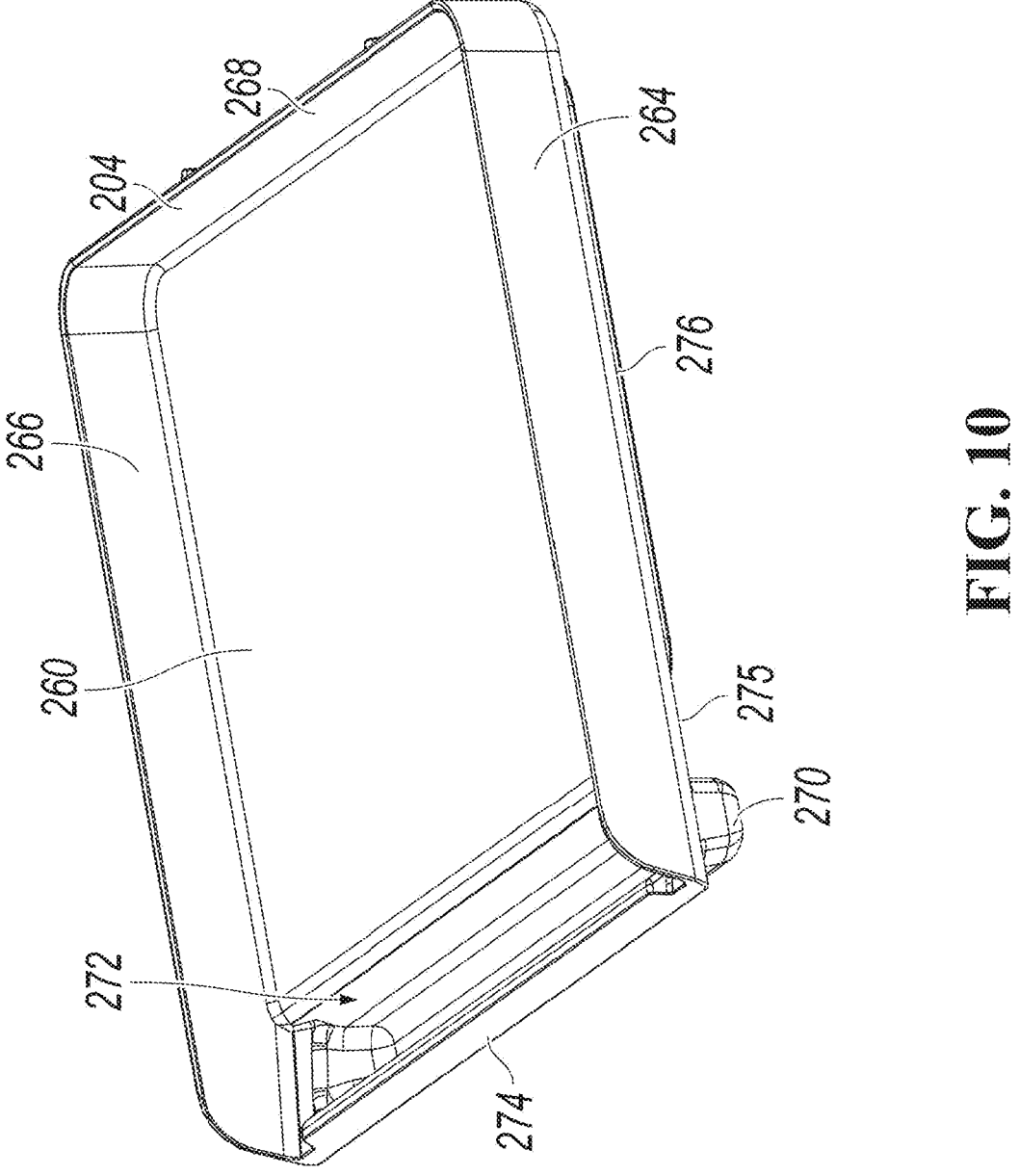
FIG. 10 is a top perspective view of another embodiment of a cooking plate removed from the cooking device.

In addition to cooking plate 104, an additional second cooking plate 204 can be used with the base 102. As depicted in FIG. 10, the second cooking plate 204 is similar to cooking plate 104, so like components will not be described in detail. The second cooking plate 204 includes a cooking surface 260, sidewalls 264, 266, rear sidewall 268, a grease trap 270, grease trap opening 272, a lip 274, a bottom surface 275, and a support rib 276. However, unlike cooking plate 104, the cooking surface 260 of the second cooking plate 204 is smooth and does not contain any ribs. The cooking surface 260 can also be covered in a nonstick coating. In the event the user would want to use the second cooking plate 204 instead of cooking plate 104, the user could remove cooking plate 104 from the base 102 and place the second cooking plate 204 on the base 102.

Figure 11:
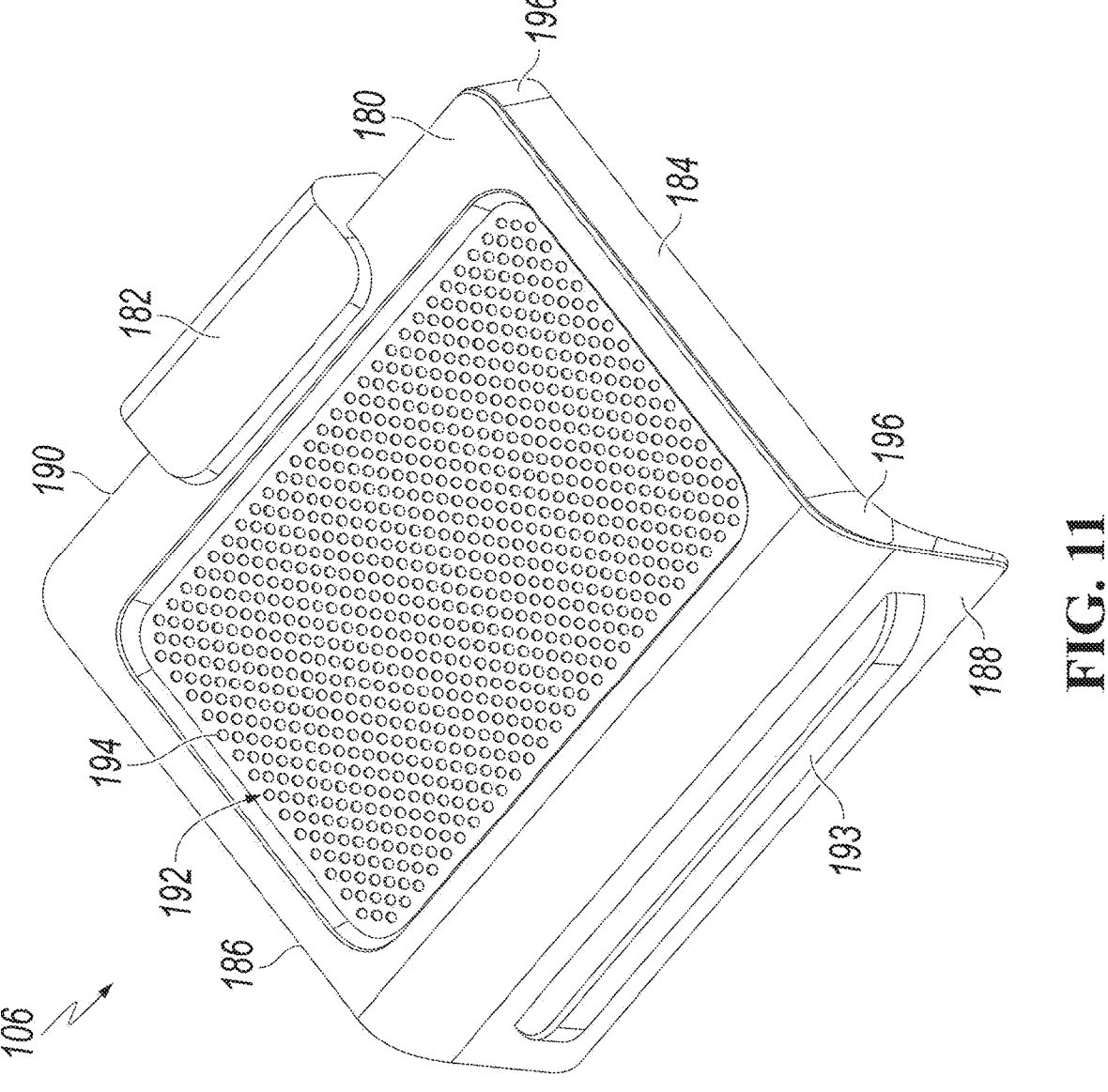
FIG. 11 is a top perspective view of the lid assembly of FIG. 1 removed from the cooking device.
Figure 12:
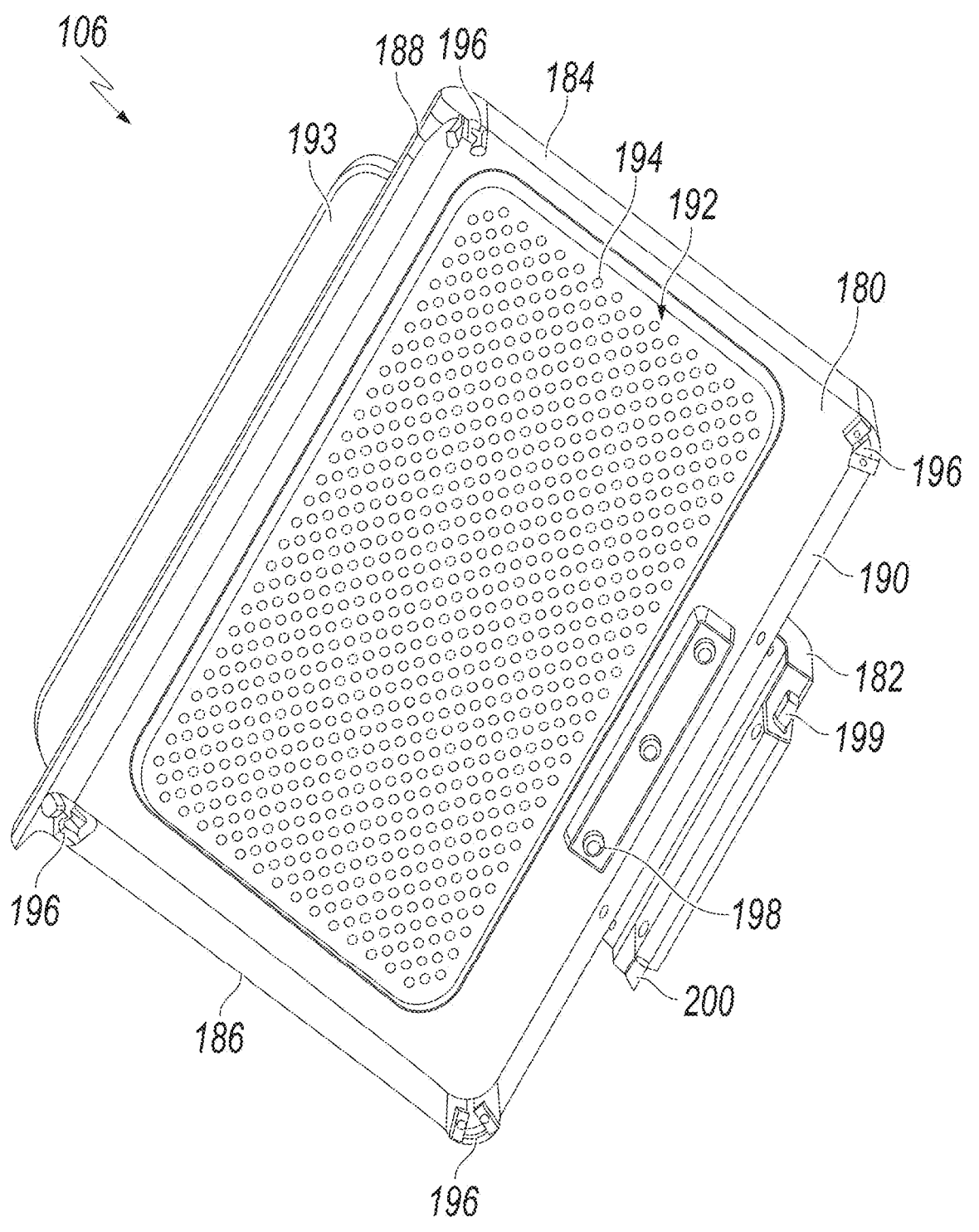
FIG. 12 is a bottom perspective view of the lid assembly of FIG. 11.
Figure 13:
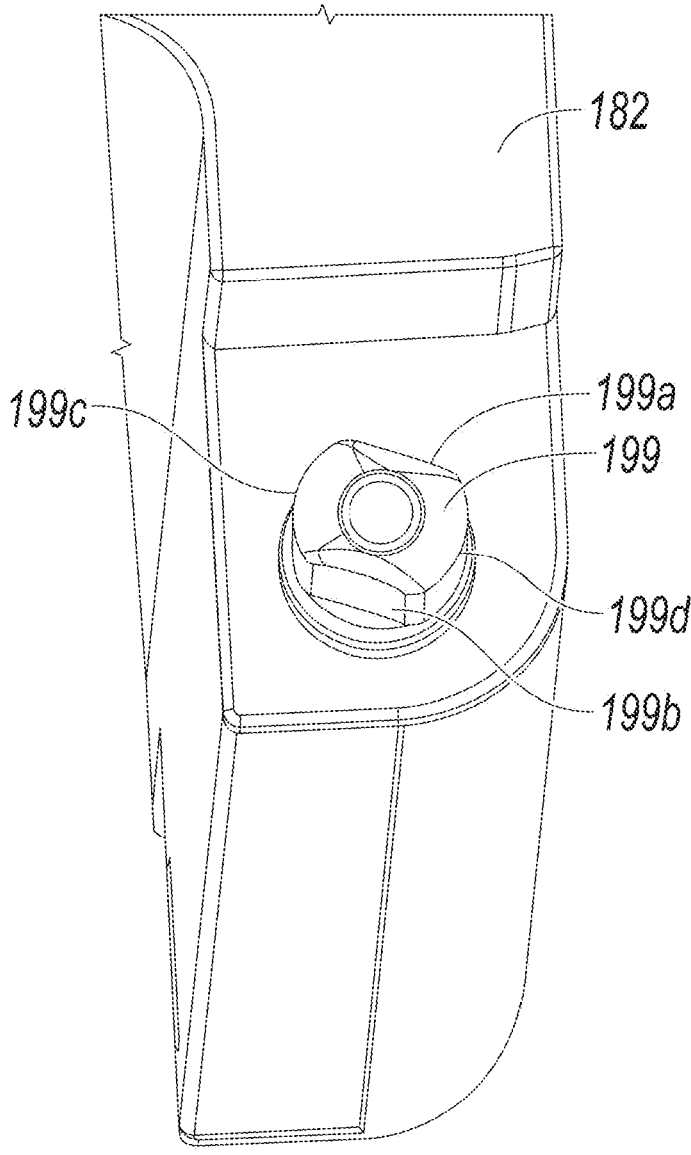
FIG. 13 is a detailed perspective view of a bracket of the lid assembly of FIG. 11.

In addition to a user wanting to exchange cooking plates, a user may also desire to prevent food particles and fluids from escaping the cooking device 100 during the cooking process. As such, the lid assembly 106 can be provided on the base 102. As depicted in FIGS. 11-13, the lid assembly can include a cover plate 180 and a bracket 182. The cover plate 180 can have a generally rectangular configuration and it can be configured to be positioned above the cooking plate 104 to cover the entire length and width of the cooking plate 104, as shown in FIG. 1. The cover plate 180 can include two sidewalls 184, 186, a front sidewall 188, and a rear sidewall 190, each of which can extend downward from the cover plate 180. A handle 193 can be arranged on the front sidewall 188 and it can be configured to allow user to raise and lower the lid assembly 106 during the cooking process without injuring themselves. In addition to preventing food particles and fluids from escaping the cooking plate 104, the cover plate 180 can be configured to allow moisture generated during the cooking process to exit the cooking volume between the cooking plate 104 and the cover plate 180 to ensure that food being cooked on the cooking plate 104 is seared, and not steamed due to excessive moisture. In order to ensure that moisture can escape the cooking plate 104, the cover plate 180 can include a center section 192 having a plurality of through-holes 194. The center section 192 can be stamped into the cover plate 180 to help add rigidity to the cover plate 180. The through-holes 194 can be arranged within the center section 192 such that food particles and grease are sufficiently retained by the cover plate 180, while moisture is allowed to pass through the through-holes 194.

In one exemplary embodiment, the through-holes 194 can have a width within a range of 1 mm to 10 mm, and preferably within a range of 3 mm to 8 mm. Additionally the pitch (e.g., the distance from the center of one through-hole to the center of an adjacent through-hole) can be within a range of 5 mm to 15 mm, and preferably 8 mm. This distancing and through-hole size can allow for sufficient moisture to be evacuated from the cooking volume while still containing a substantial amount of fluids and food particulates produced during the cooking process. Additionally, while the through-holes 194 are depicted as circles, different shapes, such as ovals, squares, slots, diamonds, etc., can be used and should be considered within the scope of this disclosure. In one exemplary embodiment, the percentage of open surface in the center region 192 due to the through-holes 194 is within a range of 10% to 30%, and preferably between 15% to 20%, and preferably at 18%. As a result, in use the temperature gradient between when the cover plate 180 is covering the cooking plate 104 (as shown in FIG. 1) and when the cover plate is 180 is in a raised position and not covering the cooking plate 104 (as shown in FIG. 2), is minimized due to the specific sizing and spacing of the through-holes 194 to ensure consistent cooking in either the raised or closed position of the cover plate 180.

Figure 14:
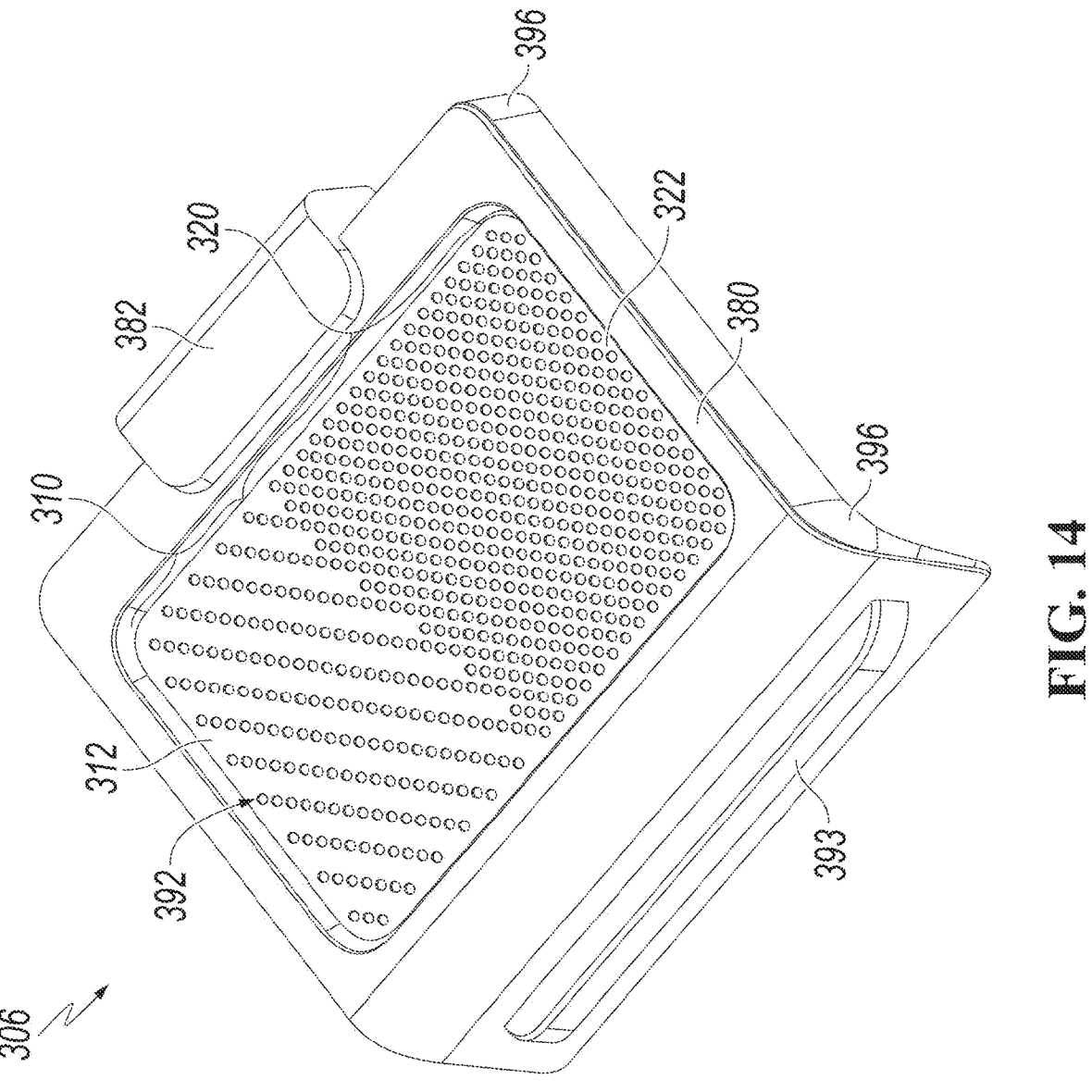
FIG. 14 is a top perspective view of another embodiment of a lid assembly.

While cover plate 180 is depicted in FIGS. 11-13 with a single hole design pattern throughout the center section 192, multiple hole design patterns can be used on a single cover plate. As depicted in FIG. 14, a lid assembly 306 can include a cover plate 380 that has more than one hole design pattern on it. The lid assembly 306 is substantially similar to the lid assembly 106 and therefore like components will not be described in detail. The cover plate 380 includes a handle 393 and spacer 396 arranged about the outer edge, and a bracket 382 for securing the lid assembly 306 to a base 102. The center section 392 includes a first zone 310 having a plurality of through-holes 312, and a second zone 320 having a plurality of through-holes 322. As depicted there are more through-holes 322 positioned in the second zone 320 than through-holes 312 arranged the first zone 310. As such, moisture would more readily escape from the second zone 320 than the first zone 310. This could allow for two different cooking zones on the cooking plate 104, where a moisture rich environment may be desired. For example, the area of the cooking plate 104 positioned below the second zone 320 could be used for searing a food product, while the area of the cooking plate 104 positioned below the first zone 310 can be used for melting cheese on a food product, since additional moisture will be helpful in melting cheese. While only two zones are depicted on the cover plate 380, additional zones having additional moisture retaining characteristics can be used and should be considered with the scope of this disclosure.

As stated above the cooking plates may be covered in a nonstick coating to aid in the release of food during the cooking process. In one aspect, this nonstick coating may be scratch resistant to metal utensils, including the cover plate 180. To ensure the cover plate 180 does not scrape the cooking plate 104, spacers 196 are arranged around the four corners of the cover plate 180. The spacers 196 may be made of a nonabrasive material such as silicone or rubber that is also heat resistant. As such, when the cover plate 180 is in a closed position, the spacers 196 are what contact the cooking plate 104 to prevent the cover plate 180 from scratching the cooking plate 104.

In order for the lid assembly 106 to move between an open and closed configuration relative to the cooking plate 104, the bracket 182 can be positioned on the rear sidewall 190 of the cover plate 180. The bracket 182 can be secured to the cover plate 180 via rivets 198, or in other embodiments it can be welded to or otherwise attached to the cover plate. In one aspect, the cover plate 180 can be removably connected to the bracket 182. The bracket 182 can extend downward from the cover plate 180 and can include two projections 199, 200 arranged on each side of the bracket 182. As depicted in FIG. 13, the projection 199 can having a cylindrical configuration with two curved surfaces 199c, 199d, and two flattened surfaces 199a, 199b arranged on opposite sides of the curved surfaces 199c, 199d. While not shown, projection 200 can have the same configuration.

Figure 15:
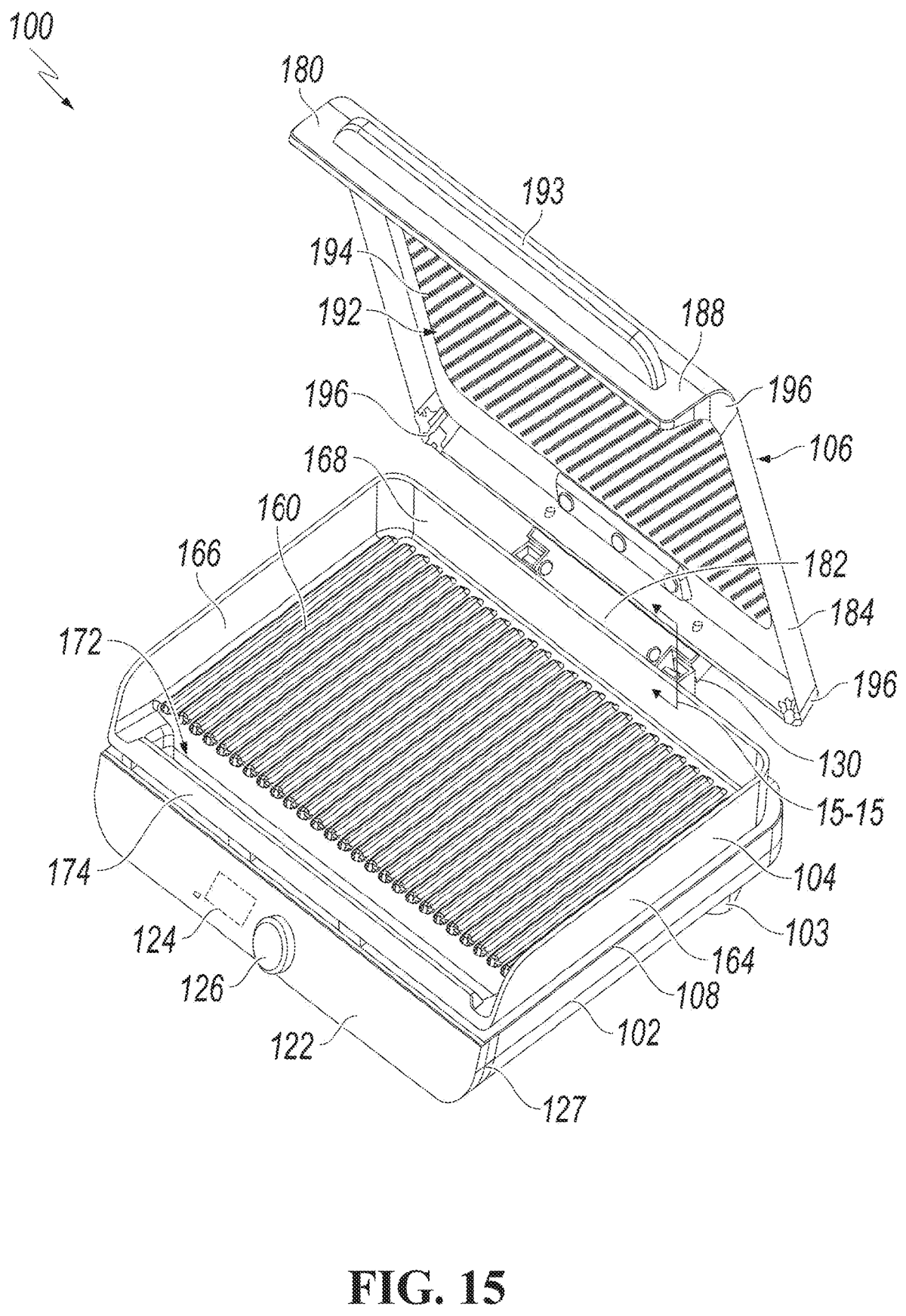
Figure 16:
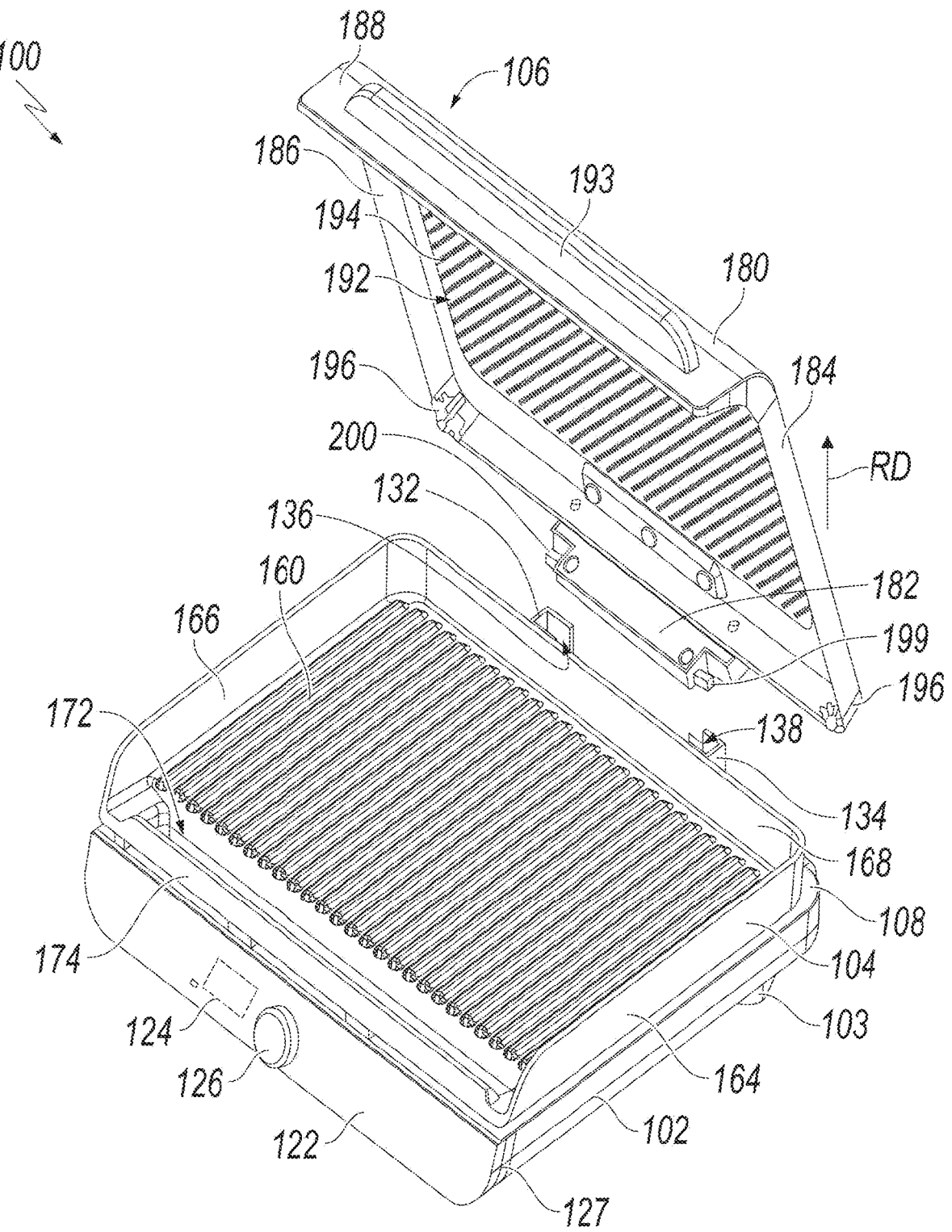
FIG. 16 is a top perspective view of the cooking device of FIG. 15 with the lid assembly removed from the cooking device.

The straight surfaces 199a, 199b and the curved surfaces 199c, 199d allow for both a pivotal connection between the lid assembly 106 and the base 102, while also allowing the lid assembly 106 to be removed from the base 102, e.g., for cleaning, when the lid assembly 106 is at a specific angle relative to the base 102. The removal position of the lid assembly 106 relative to the base 102 is depicted in FIGS. 15-16. When the lid assembly 106 is at the proper angle, as shown in FIG. 15, the straight sections 199a, 199b align with the straight wall sections 142, 144 of the slot 138 in the base. The straight sections of projection 200 also align with the straight wall sections 152, 154 of the slot 134 simultaneously. The lid assembly 106 can thus be lifted vertically upward in the removal direction RD (as shown in FIG. 16) when the lid assembly 106 is in the removal position. With the straight sections 199a, 199b aligned with the straight wall sections 142, 144 of the slot 138, the projection 199 can pass through the slot 138. Simultaneously the projection 199 can pass to the slot 136, allowing the lid assembly 106 to be removed from the base 102. In order to connect the lid assembly 106 to the base 102, this process can be reversed by aligning the lid assembly 106 at the proper angle and inserting the projections 199, 200 within the slots 136, 138. When the lid assembly 106 is in the fully closed or fully open positions, the curved surfaces 199c, 199d prevent the projection 199 from passing through the gap between the straight wall sections 142, 144.

Figure 17:
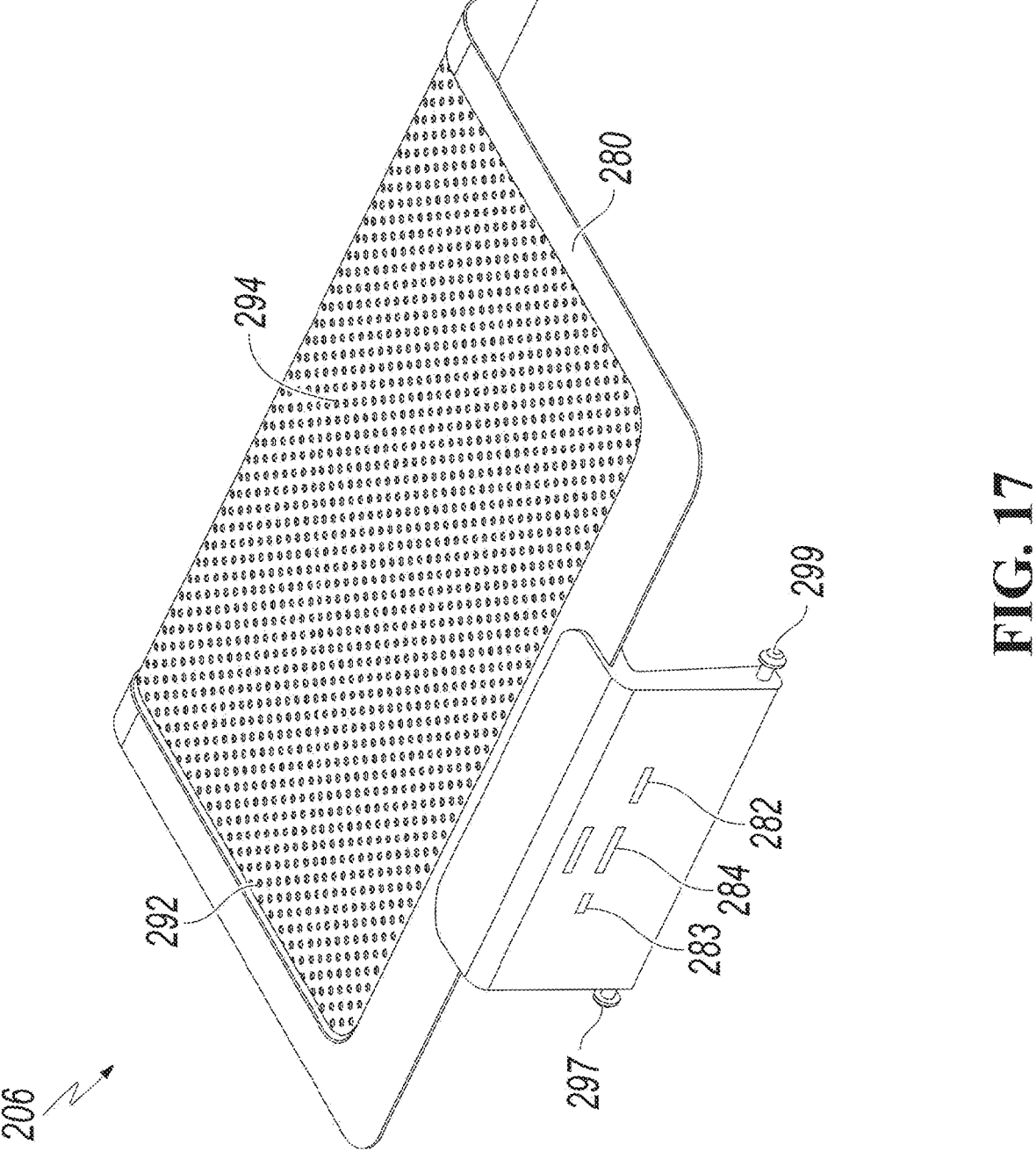
FIG. 17 is a rear perspective view of another embodiment of a lid assembly.
Figure 18:
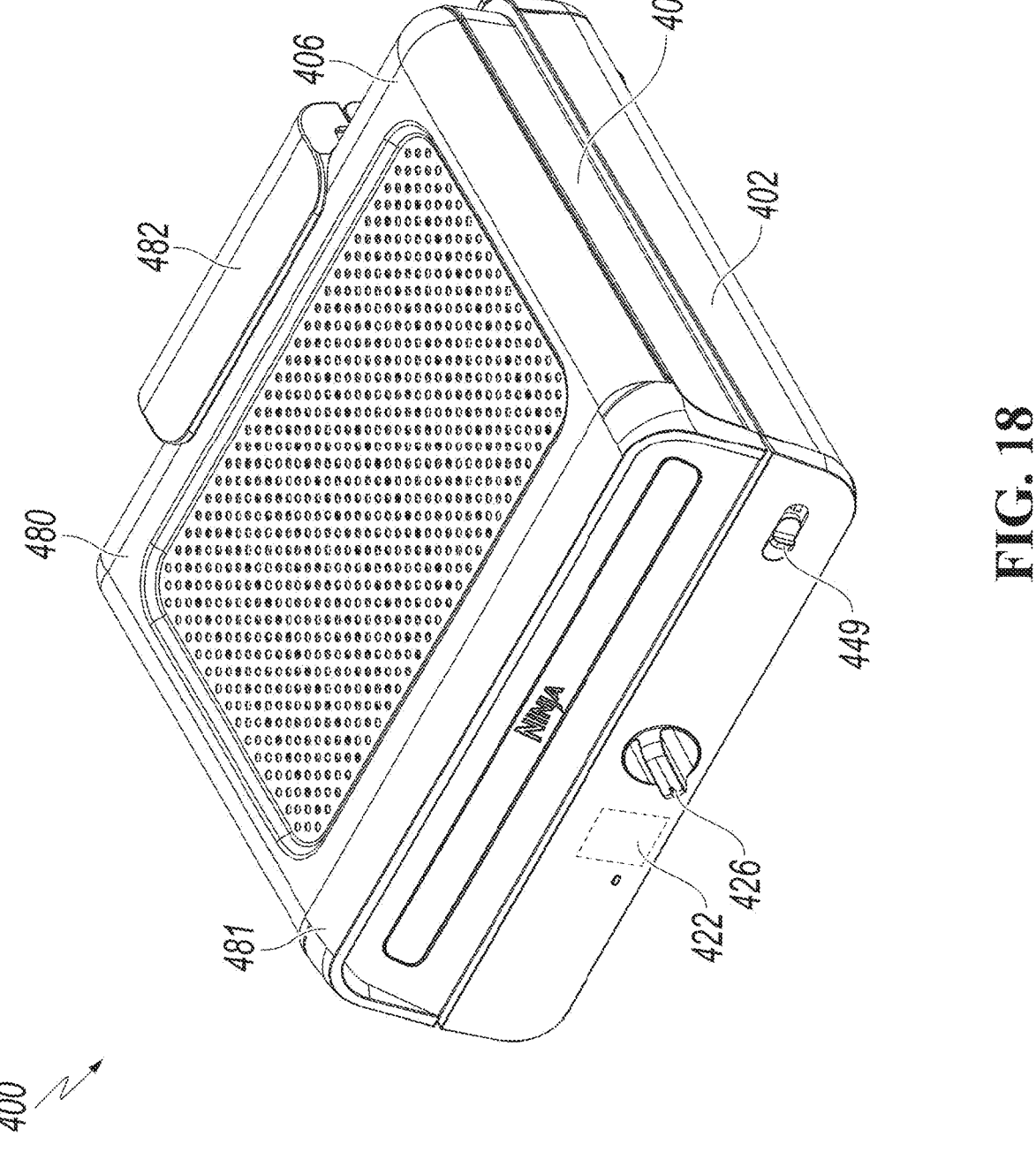
FIG. 18 is a front perspective view of another embodiment of a cooking device having a lid assembly coupled thereto.

While the cover plate 180 is depicted as being permanently secured to the bracket 182, embodiments where the cover plate can be removed from the bracket are also provided. As depicted in FIG. 17, the lid assembly 206 can be used with a cover plate 280 that can be detached from the bracket 282. Lid assembly 206 is similar to lid assembly 106, therefore like components will not be explained in detail. Lid assembly 206 includes a cover plate 280 having a center section 292 and a plurality of through-holes 294. The bracket 282 also includes projections 297, 299 which operate similarly to projections 199, 200 of bracket 182. The bracket 282 allows for removal of the assembly 206 from a base, but also allows for removal of the cover plate 280 from the bracket 282. The cover plate 280 is connected to the bracket 282 through a clip mechanism (not shown) that can be actuated with lever 283. Lever 283 is arranged on the rear of the bracket 282 and can slide within a track 284 in order to release the cover plate 280 from the bracket 282. In order to reinsert the cover plate 280 into the bracket 282, the user can slide the bracket 282 back onto the cover plate 280. The removal of the cover plate 280 from the bracket can allow for additional cleaning of the cover plate 280.

FIGS. 18-28 illustrate another embodiment of a cooking device 400 operable to prepare a food product and suitable for use on a support surface. The cooking device 400 is similar to cooking device 100, so like components will not be described in detail. The cooking device 400 generally includes a base 402, a cooking plate 404, and a lid assembly 406. As explained in detail below, the base 402, cooking plate 404, and lid assembly 406 can be connected together to form the cooking device 400.

Figure 19:
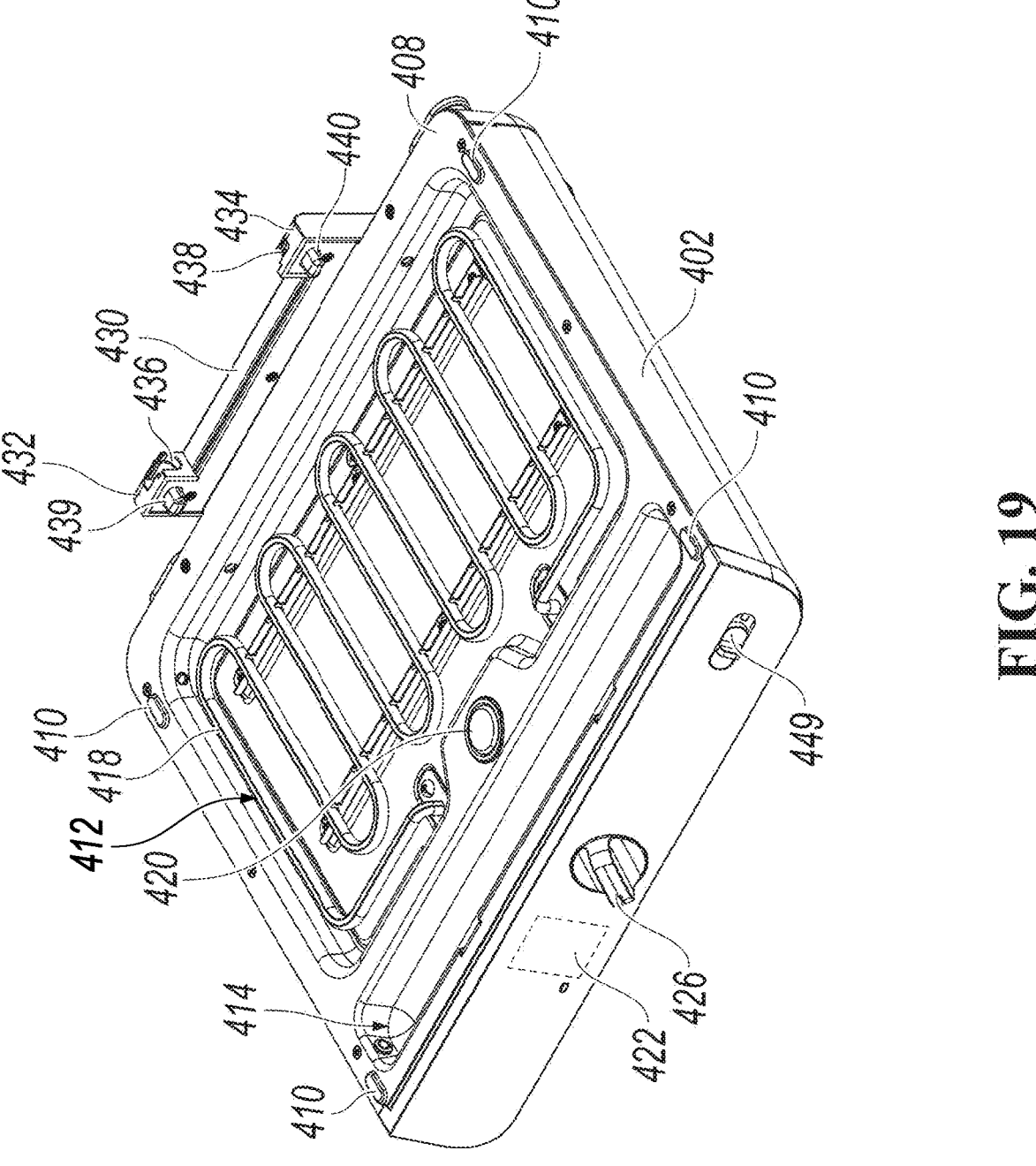
FIG. 19 is a front perspective view of the cooking device of FIG. 18 with the lid assembly and cooking plate removed from the cooking device.
Figure 20:
FIG. 20 is a rear perspective view of the cooking device of FIG. 18 with the lid assembly and cooking plate removed from the cooking device.
Figure 21:
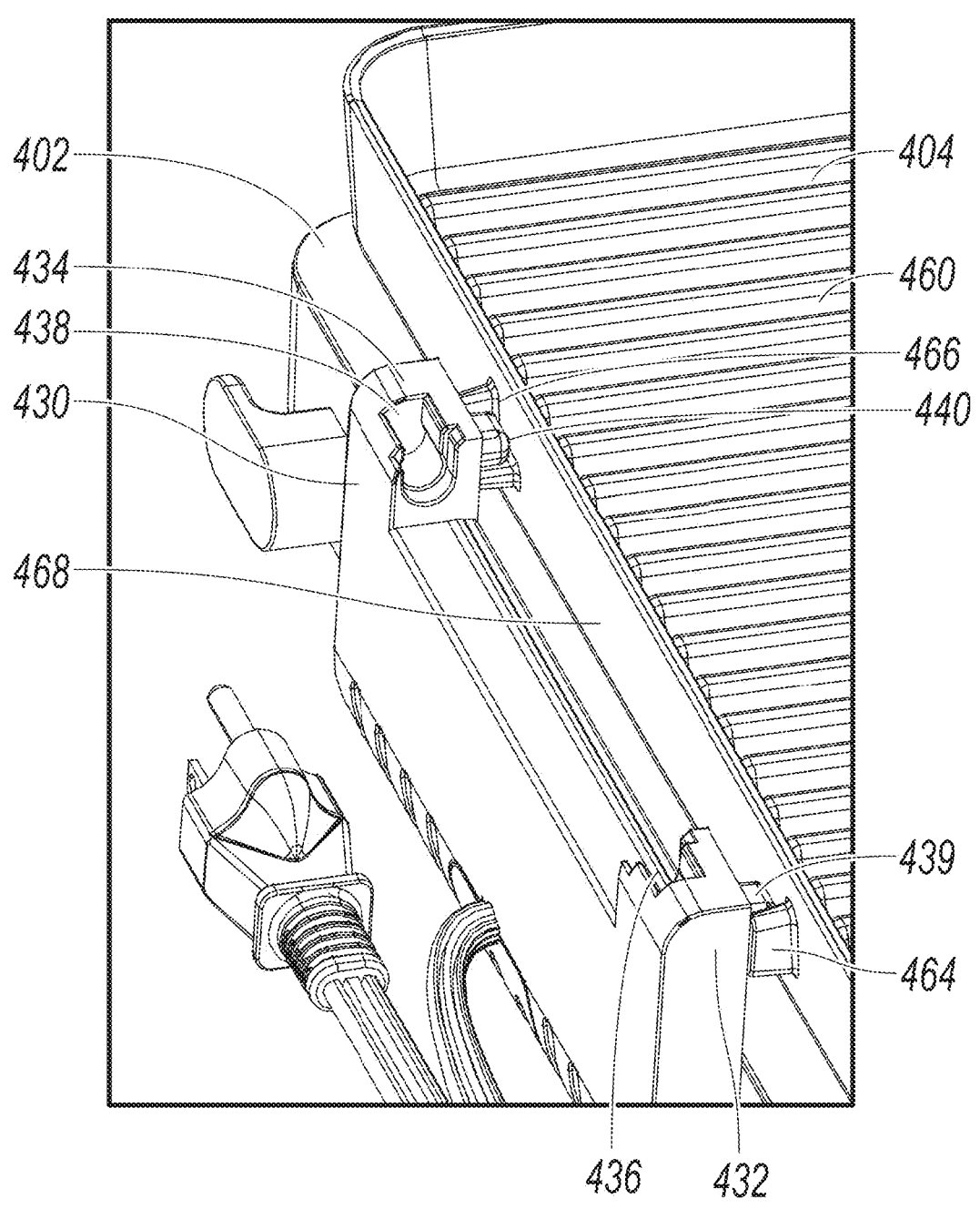
FIG. 21 is a detailed rear perspective view of a bracket of the cooking device of FIG. 18 with the lid assembly removed from the cooking device.

The base 402, shown in FIGS. 19-21, is similar to the base 102, and generally has a rectangular configuration and includes an upper surface 408 and a lower surface 409. The upper surface 408 of an outer rim 411 of the base 402 can include projections 410, which can be configured to support a cooking plate above the upper surface 408.

The base 402 can include a bracket 430, which is similar to the bracket 130, and arranged on a rear surface 128 of the base 102. As shown in FIGS. 19-21, the bracket 430 includes projections 432, 434 arranged on opposite sides of the bracket 430, similar to the projections 132, 134. The projections 432, 434 can include slots 436, 438 formed therein, respectively. Additionally, the bracket 430 can include projections 439, 440 extending outward from the bracket 430. The projections 439, 440 can extend parallel to the upper surface 408 of the base 402 and correspond to retention features arranged on the cooking plate 404, as described in detail below. The projections 439, 440 can be formed from a non-abrasive material, such as rubber or silicon, in order to prevent scratching of the cooking plate 404 when inserted on the base 402.

Figure 24:
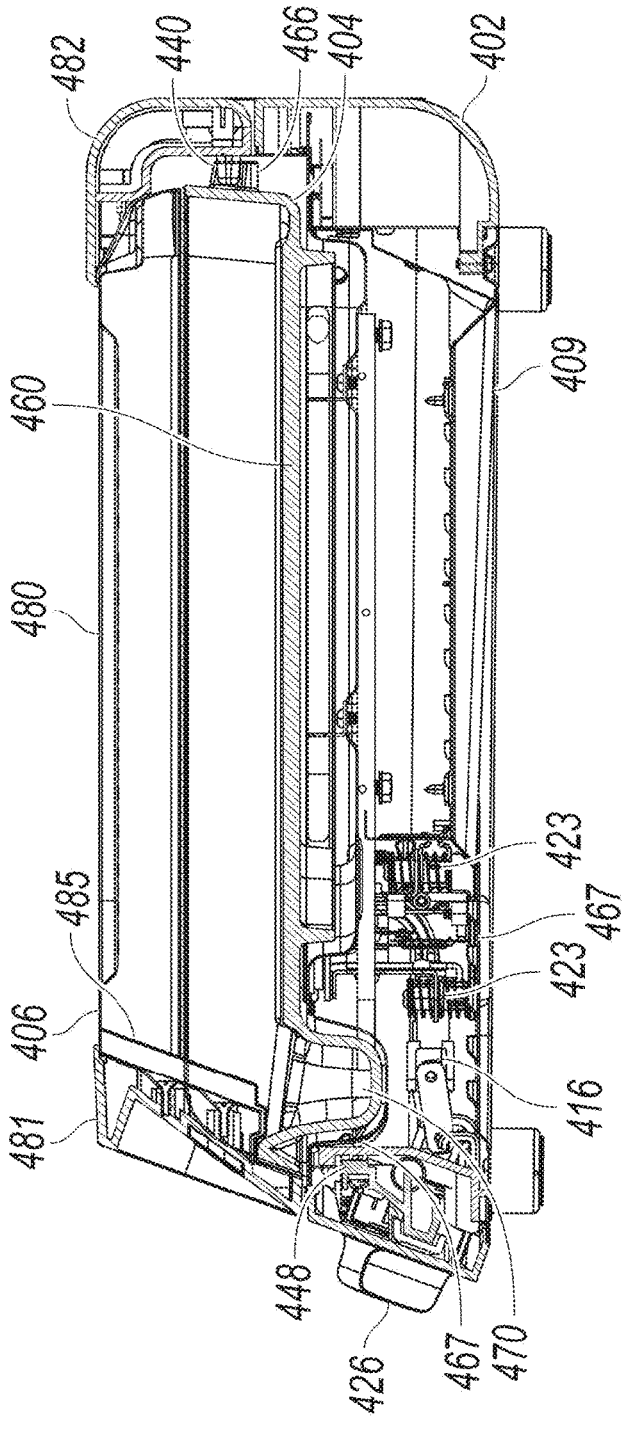
FIG. 24 is a cross-sectional view of the cooking device of FIG. 18.
Figure 24:
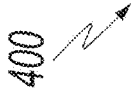
Figure 25:
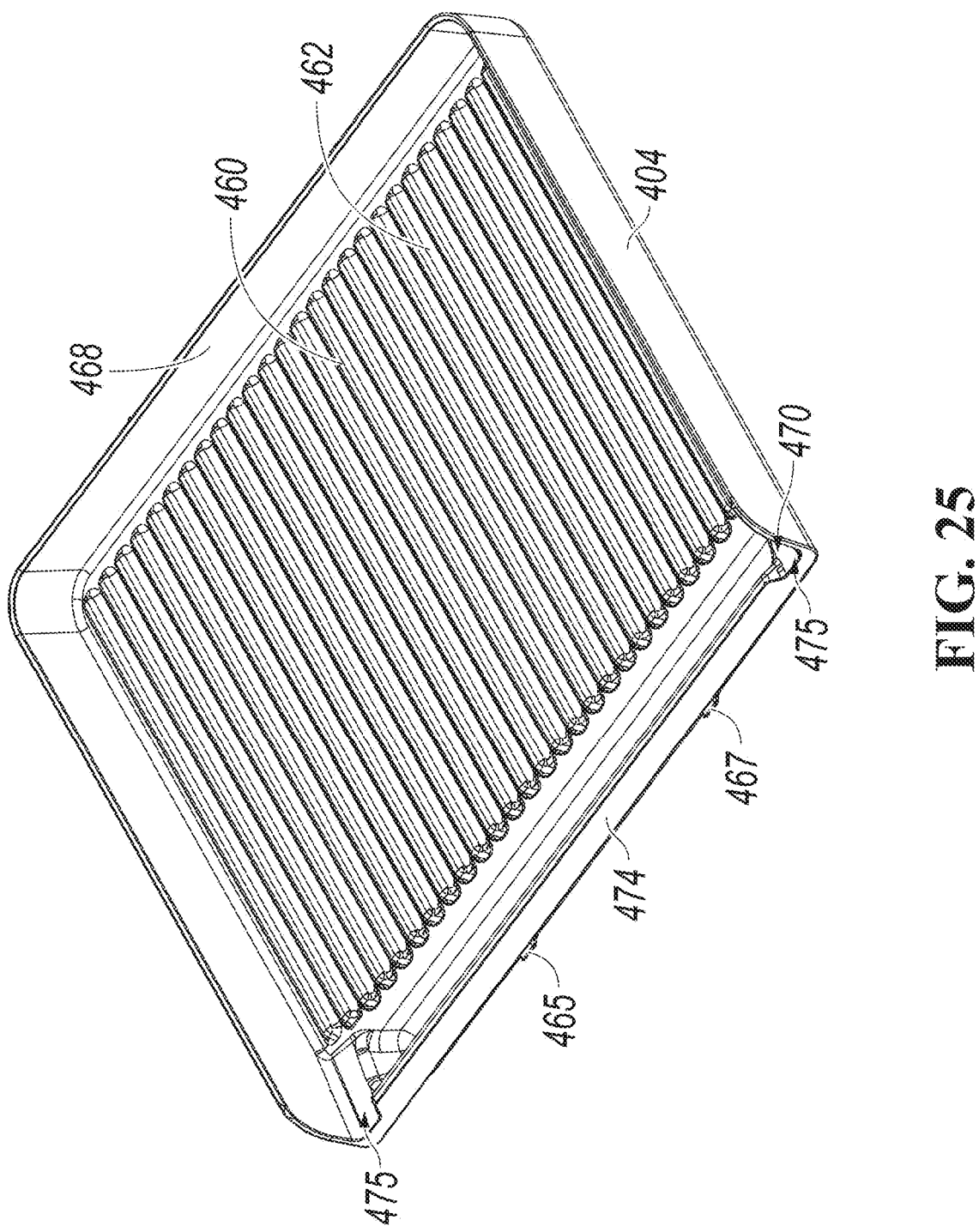
FIG. 25 is a front perspective view of a cooking plate of the cooking device of FIG. 18 removed from the cooking device.
Figure 26:
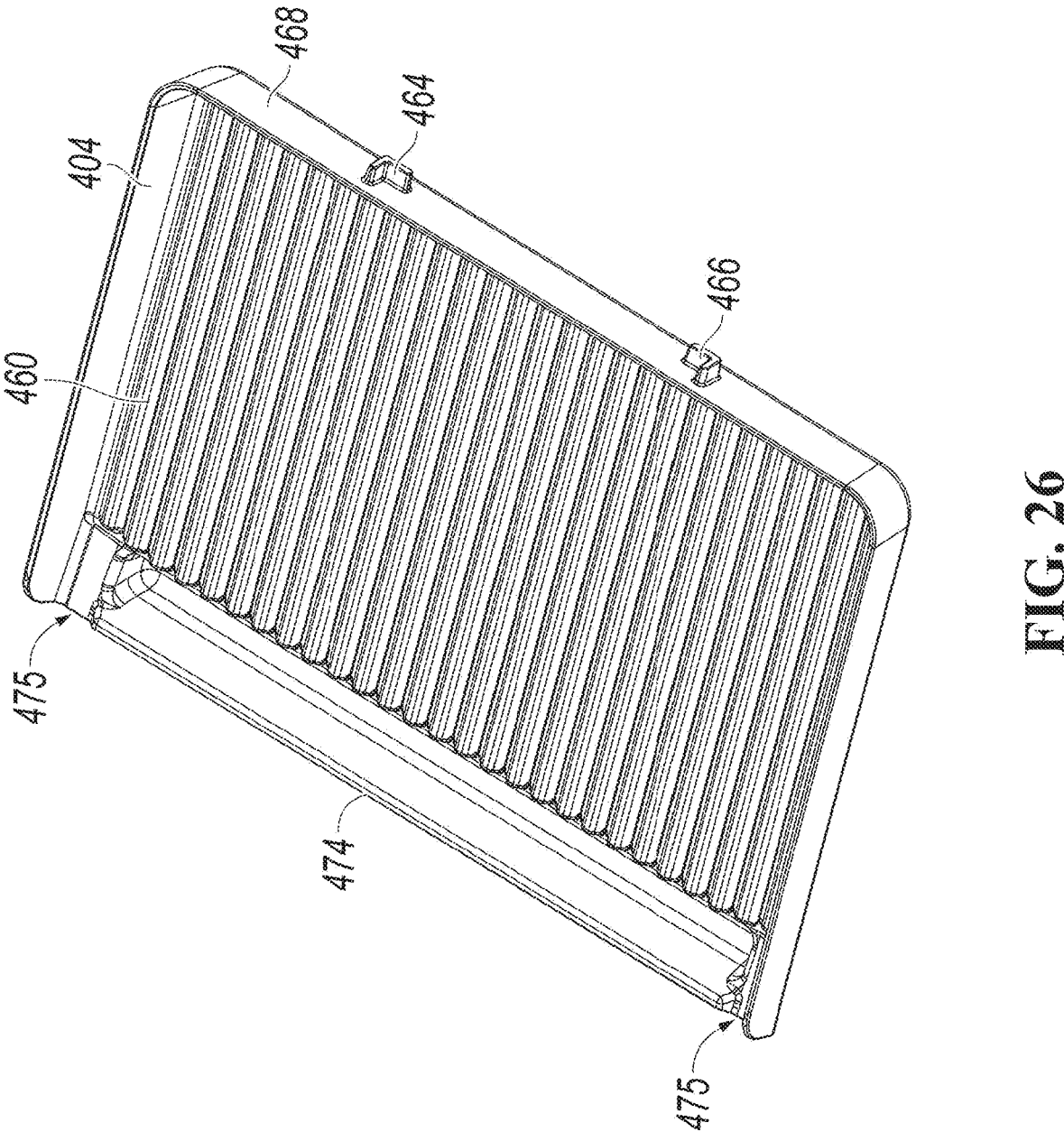
FIG. 26 is a rear perspective view of a cooking plate of the cooking device of FIG. 18 removed from the cooking device.

In addition to the projections 439, 440, the base 402 also includes retention projections 447, 448 arranged within a cavity 414 of the base 402, depicted in FIGS. 20 and 24. The retention projections 447, 448 are angled bodies which extend into the cavity 414 and correspond to projections on the cooking plate 404, which is described in detail below. The retention projections 447, 448 extend through apertures within the base 402 and into the cavity 414, allowing the retention projections 447, 448 to move horizontally relative to the base 402. In order to actuate the retention projections 447, 448, a slider 449 arranged on the front of the base 402 can be actuated by a user, thereby moving the retention projections 447, 448 within the apertures within the base 402. In some embodiments, the base 402 does not include the retention projections 447, 448 or slider 449. In these embodiments, the weight of the cooking plate 404 is sufficient to hold the cooking plate 404 on the base 402.

In order to control the heat produced by a heating element 416 within the base 402, a temperature sensor 420 can be arranged within the base 402. In the illustrated embodiment, the temperature sensor 420 is arranged between a first cavity 412 and the second cavity 414 and is centrally located along the width of the base 402, similar to the temperature sensor 120. The temperature sensor 420 can be configured to extend upward past the upper surface 408 in order to contact a cooking plate 404 arranged on the base 402. The temperature sensor 120 is configured to measure the temperature of the cooking plate 404. In one aspect, the temperature sensor 420 can be a negative temperature coefficient (NTC) thermistor, or a thermostat.

Figure 22:
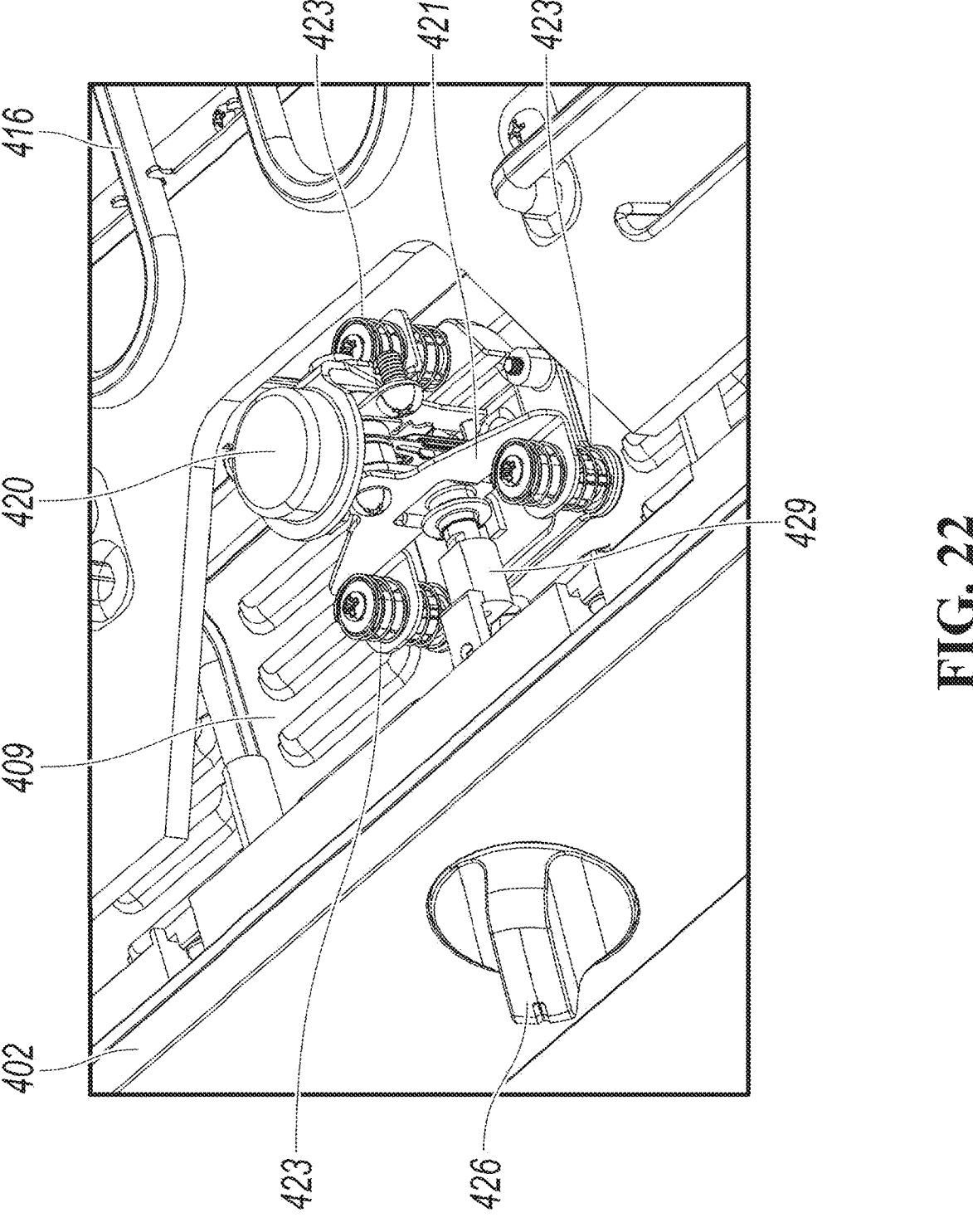
FIG. 22 is a detailed front perspective view of a temperature sensor assembly of the cooking device of FIG. 18.
Figure 23:
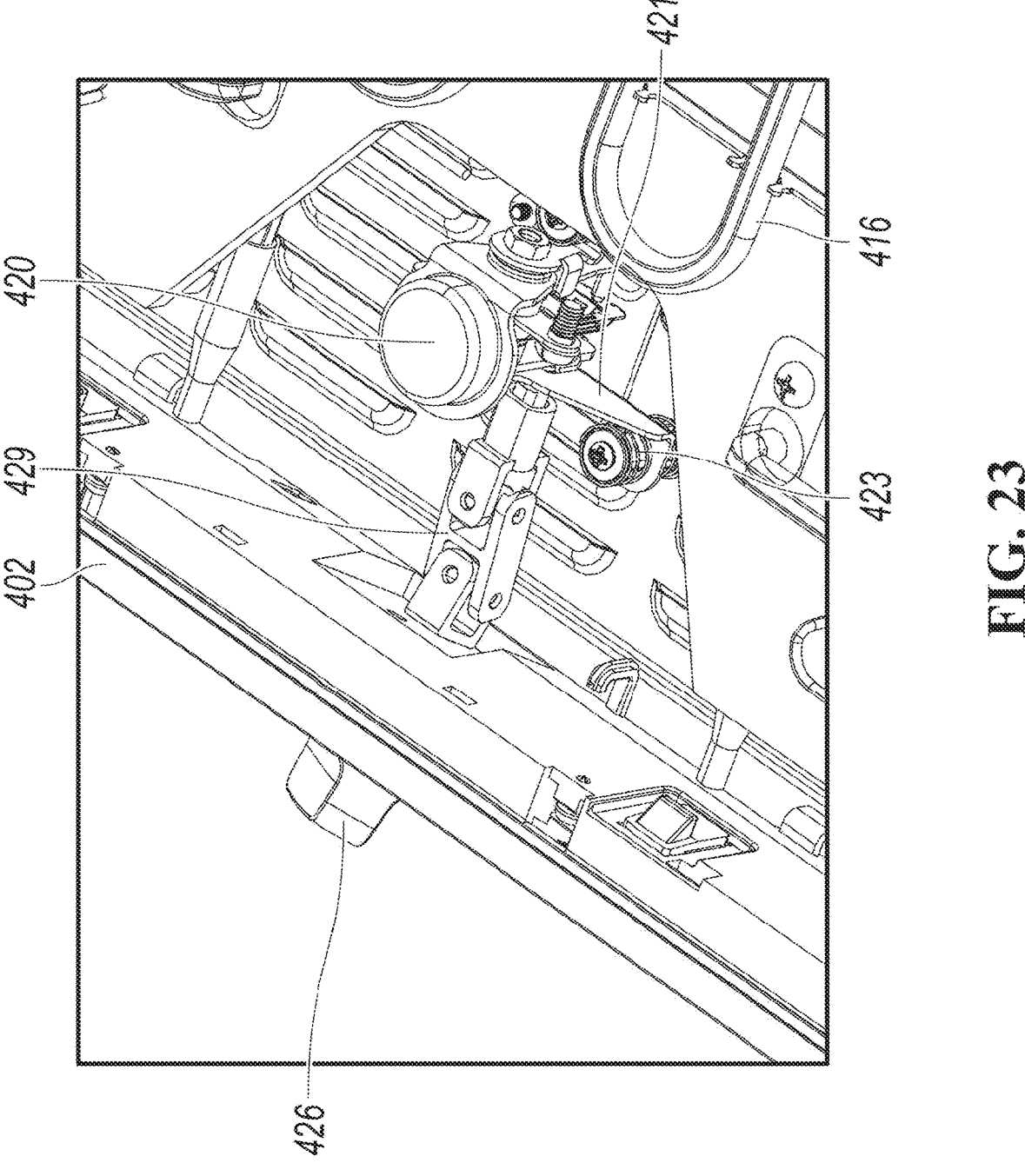
FIG. 23 is a detailed rear perspective view of the temperature sensor assembly of FIG. 22.

As depicted in FIGS. 22 and 23, the temperature sensor 420 is arranged on a bracket 421 on the lower surface 409 of the base 402. The bracket 421 can be connected to the lower surface 409 of the base 402 by springs 423. The spring 423 are arranged at three points about the bracket 421, and extend upward from the lower surface 409, biasing the temperature sensor 420 in the vertical direction, allowing the temperature sensor 420 to move relative to the base 402. As such, when the cooking plate 404 is placed on the base 402, the temperature sensor will be biased into the cooking plate 404 to ensure sufficient contact between the temperature sensor 420 and the cooking plate 404. This arrangement ensures an accurate reading from the temperature sensor 420 of the temperature of the cooking plate 404 since the temperature sensor 420 will be flush against the cooking plate 404. While compression springs are shown, any type of spring member can be used to bias the temperature sensor 420 relative to the base 402.

In addition to use of the temperature sensor 420 in order to control the heating element 416, a control panel 422 can be arranged on the front surface 427 of the base 402, similar to the control panel 122. In the illustrated embodiment depicted in FIG. 22, the control panel 422 includes an input dial 426. The input dial 426 can be configured to allow user to input different cooking parameters based on the desired cooking procedure, such as increasing or decreasing the temperature of the heating element 416 through the temperature reading of the temperature sensor 420. In one aspect, the control panel 422, temperature sensor 420, and heating element 416 can all be communicatively coupled to a control unit (not shown) which receives input from the control panel 422 and temperature sensor 420, and then controls the power input to the heating element 416 based on the rotational position of the input dial 426.

The input dial 426 is mechanically connected to the temperature sensor 420, and is configured to alter the temperature threshold of the temperature sensor 420. As shown in FIGS. 22 and 23, a linkage 429 is arranged between the input dial 426 and the temperature sensor 420. As a user rotates the input dial 426, the temperature threshold of the temperature sensor 420, where the temperature sensor 420 will send an input to deactivate the heating element 416, can be increased or decreased in order to control the temperature of the cooking plate 404. Specifically, the linkage 429 include a double universal pivot joint such that the rotation of the input dial 426 will not alter the vertical height of the temperature sensor 420, ensure sufficient contact remains between the cooking plate 404 and the temperature sensor 420.

As stated above, the base 402 is configured to support a cooking plate 404 such that the heating element 416 can produce heat to the cooking plate 404. The cooking plate 404 is similar to the cooking plate 104, therefore, like components will not be described in detail. As depicted in FIGS. 24-27, the illustrated cooking plate 404 is generally rectangular and is configured to rest on top of the base 402 in order to arrange the heating element 416 below the cooking surface 460. In one aspect, the cooking surface 460 can include ribs 462 arranged along the cooking surface 460. In another aspect, the cooking surface can be flat and not include ribs. A lip 474 can be arranged on the front edge of the cooking plate 404, and it can be configured to help contain grease, fluids, and food particulates within the cooking plate 404. Arranged on either end of the lip 474 is a channel 475, allowing a user to pour any particulates or fluids collected by the grease trap 470 from the cooking plate 404 after a cooking procedure.

Arranged on a rear sidewall 468 of the cooking plate 404 are retention projections 464, 466. Depicted in FIG. 26, the retention projections 464, 466 extend outward horizontally from the rear sidewall 468 and correspond to the projections 439, 440 of the bracket 430. The retention projection 464, 466 are L-shaped, and when contacting the projections 439, 440, prevent both vertical movement and lateral movement of the cooking plate 404 when arranged on the base. The retention projections 464, 466 can be integral with the cooking plate 404.

Figure 27:
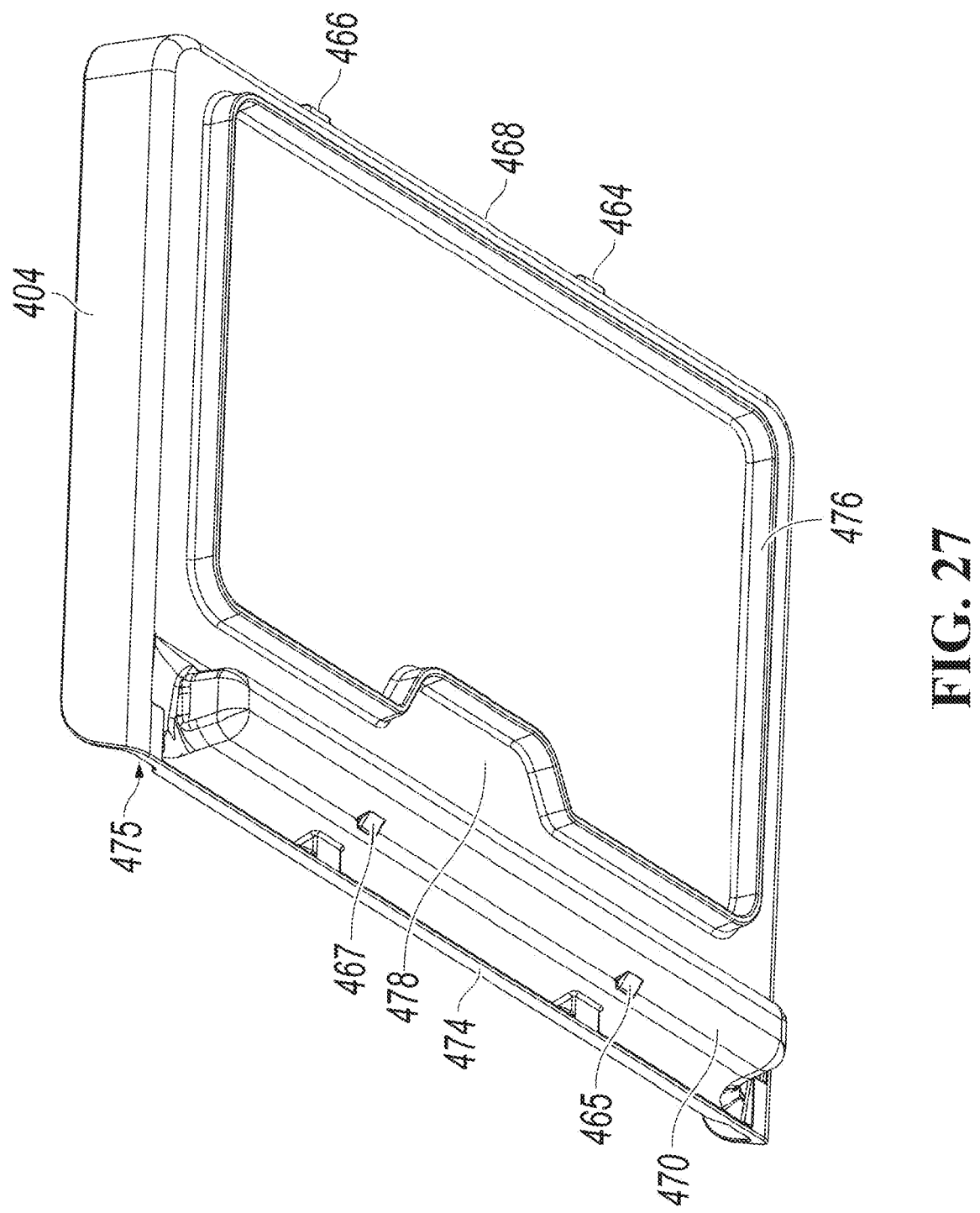
FIG. 27 is a bottom perspective view of the cooking plate of FIG. 26.

As further shown in FIG. 27, a support rib 476 can be arranged on a bottom surface 475 of the cooking plate 104.

Additionally a sensor contact 478 can be arranged on the bottom surface 475 of the cooking plate 404. Also depicted in FIG. 27 are retention projections 465, 467 arranged on the grease trap 470.

The retention projections 465, 467 are angled bodies which extend outward from the grease trap 470 and correspond to the retention projections 447, 448 within the base 402. The retention projections 465, 467 are rigidly fixed to the cooking plate 404. As depicted in FIG. 24, when the cooking plate 404 is arranged on the base 402, the retention projections 465, 467 are arranged underneath the retention projections 447, 448, locking the cooking plate 404 to the base 402. Additionally shown in FIG. 24, the retention projection 466 is arranged underneath the projection 440 of the bracket 430. Both of these connections prevents the cooking plate 404 from being removed from the base 402 without actuating the slider 449, releasing the retention projections 447, 448 from the retention projections 465, 467.

Figure 28:
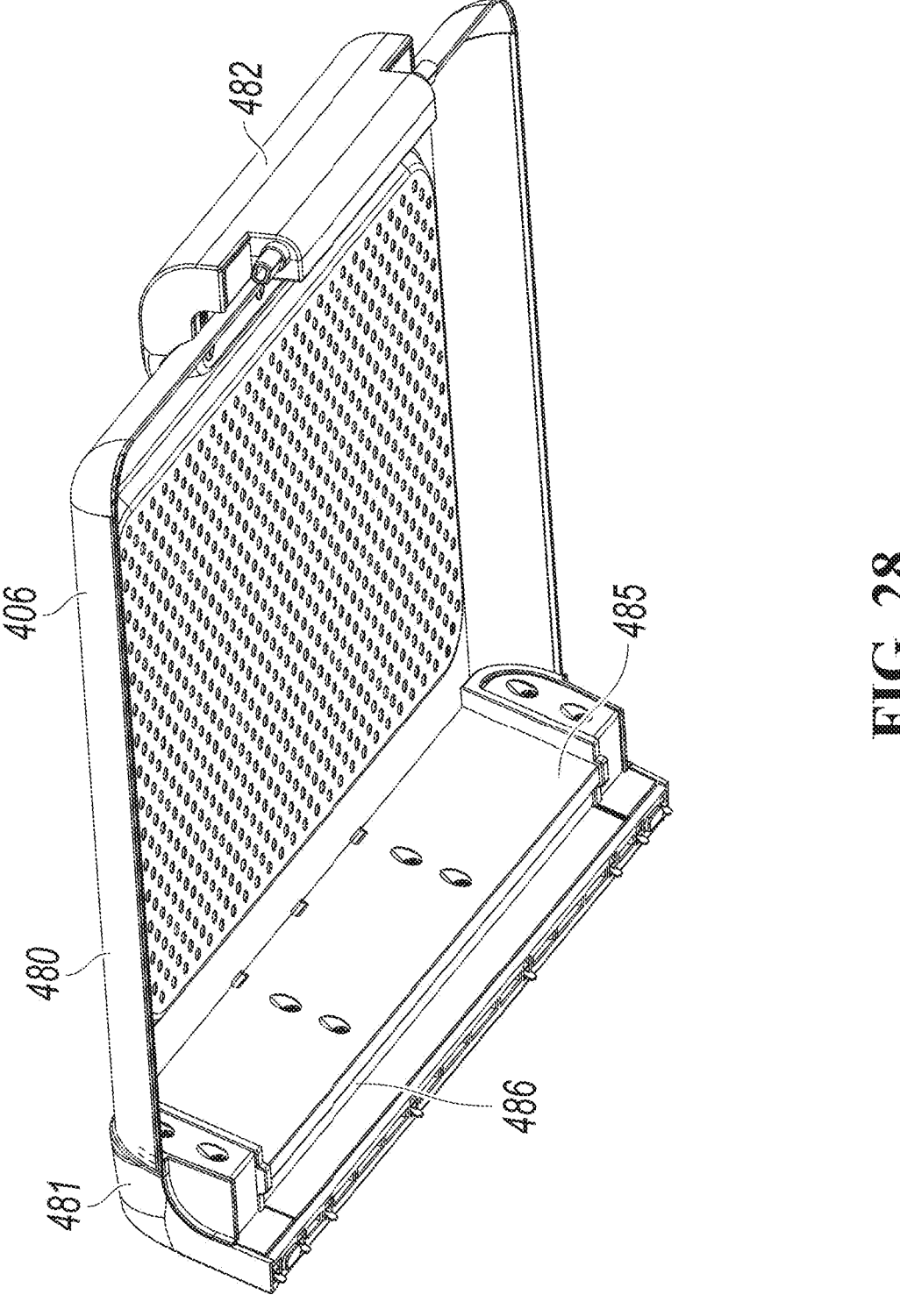
FIG. 28 is a bottom perspective view of the lid assembly of FIG. 18 removed from the cooking device.

A user may also desire to prevent food particles and fluids from escaping the cooking device 400 during the cooking process. As such, the lid assembly 406 can be provided on the base 402. The lid assembly 406 is similar to the lid assembly 106, therefore, like components are not described in detail. The lid assembly 406 can be removed from the base 402 similarly to how the lid assembly 106 is removed from the base 102, described in detail above. As depicted in FIGS. 24 and 28, the lid assembly 406 can include a top cover plate 480, a front cover plate 481, and a bracket 482. The front cover plate 481 includes an internal surface 485 terminating at an edge 486, which is configured to direct splattering fluid and grease within the cooking device 400 into the grease trap 470. As shown in FIG. 24, the internal surface 485 is vertically arranged over the grease trap 470, allowing any fluids which contact the internal surface 485 to drip down form the edge 486 to be collected within the grease trap 470.

FIGS. 29-35 illustrate another embodiment of a cooking device 500 operable to prepare a food product and suitable for use on a support surface. The cooking device 500 is similar to cooking devices 100 and 400, so like components will not be described in detail. The cooking device 500 generally includes a base 502, a cooking plate 504, and a lid assembly 506. As explained in detail below, the base 502, cooking plate 504, and lid assembly 506 can be connected together to form the cooking device 500.

Figure 29:
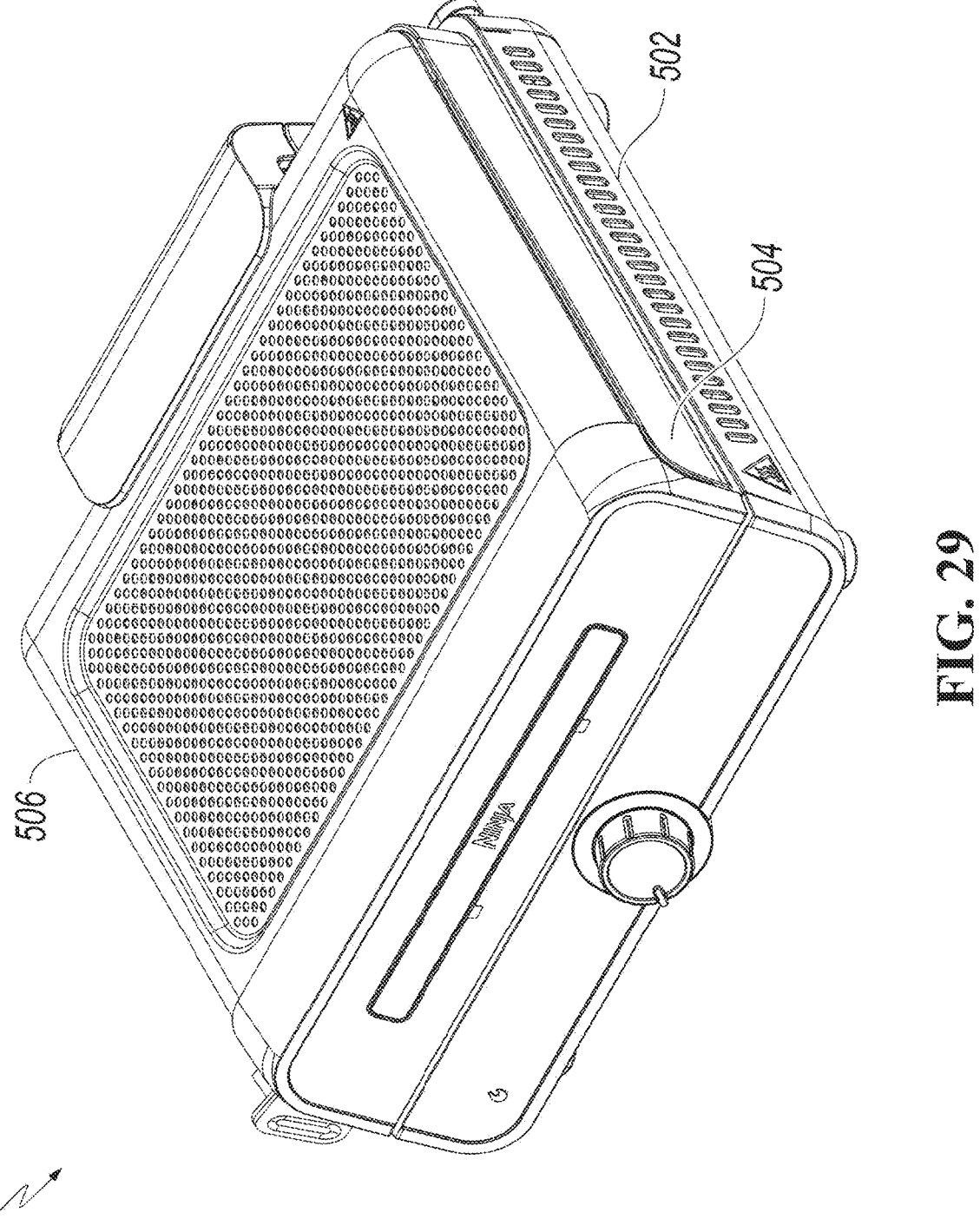
FIG. 29 is a front perspective view of another embodiment of a cooking device having a lid assembly coupled thereto.
Figure 30:
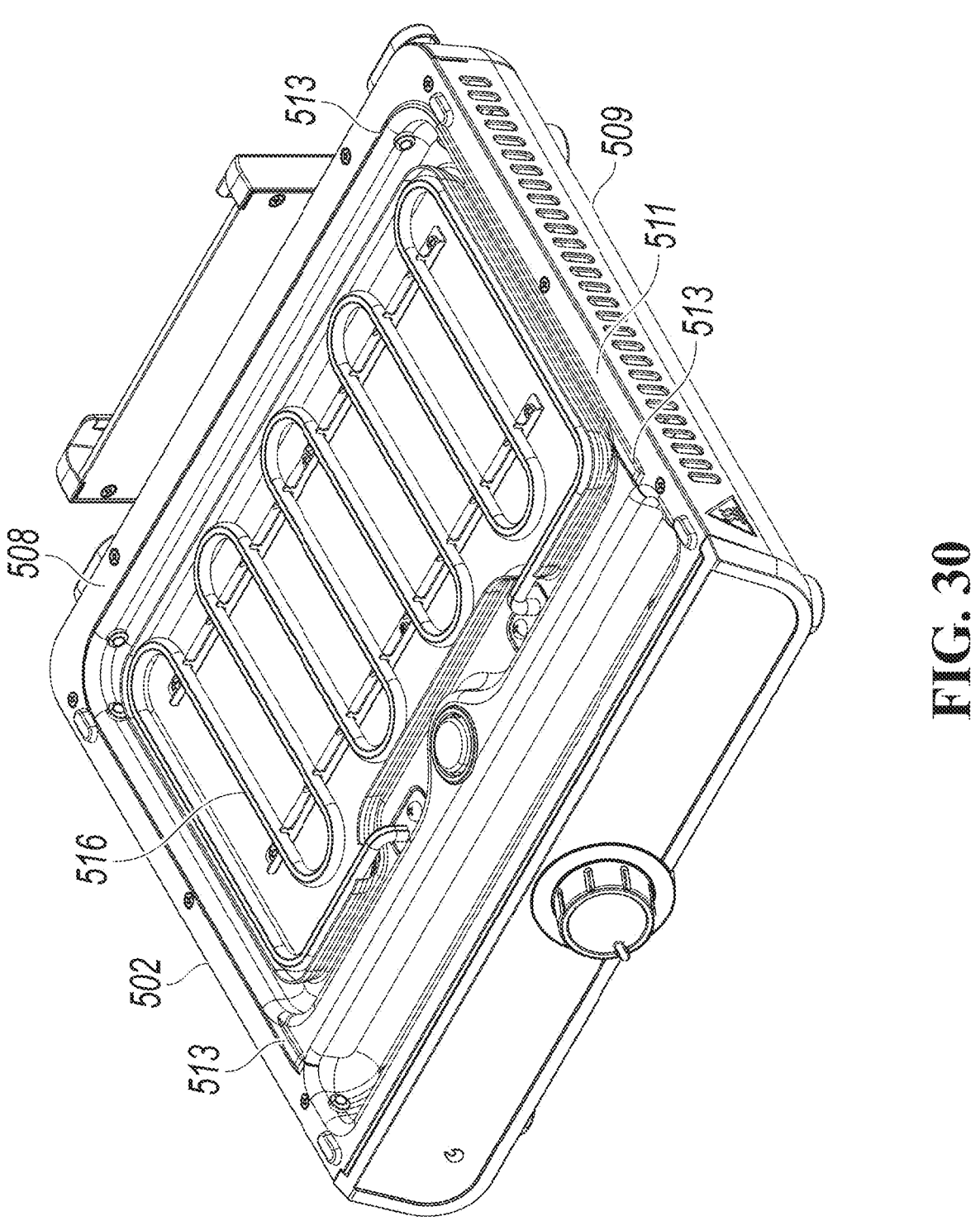
FIG. 30 is a front perspective view of the cooking device of FIG. 29 with the lid assembly and cooking plate removed from the cooking device.
Figure 33:
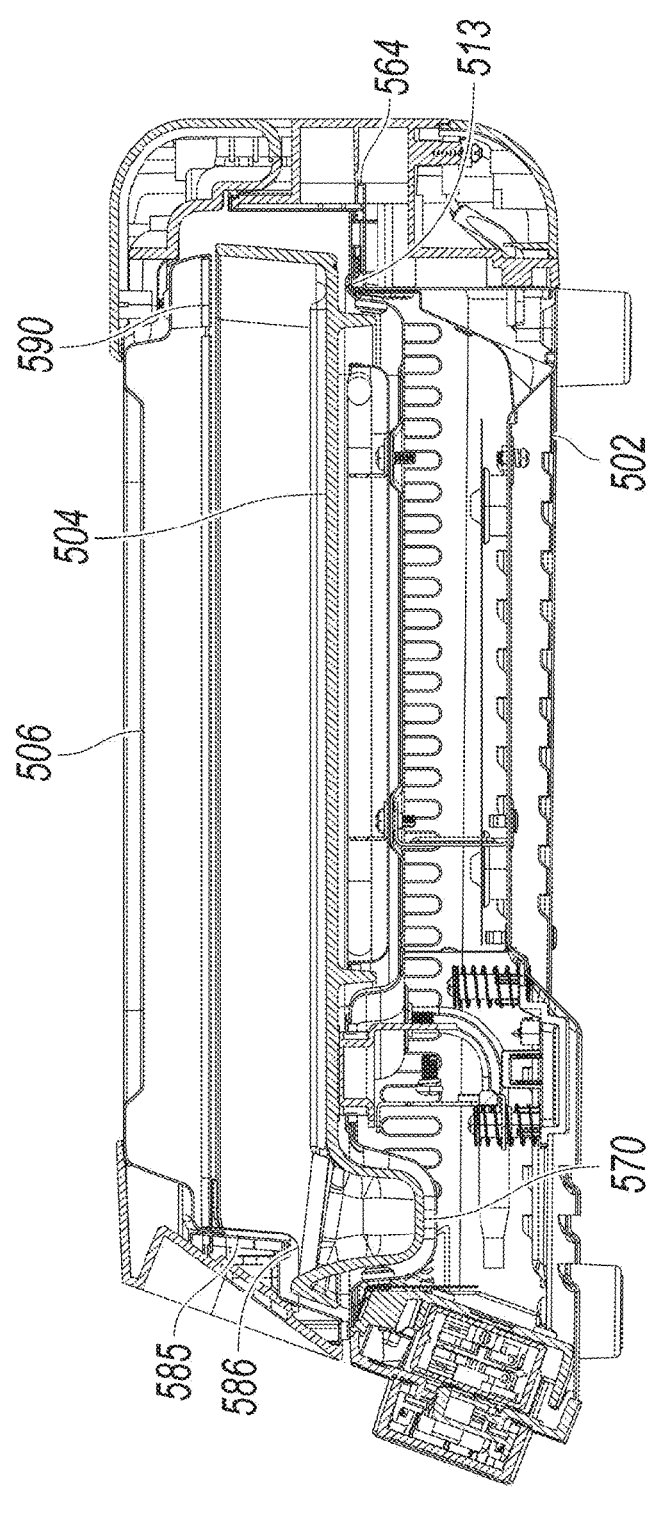
FIG. 33 is a cross-sectional view of the cooking device of FIG. 29.

The base 502, shown in FIGS. 29, 30, and 33, is similar to the base 102 and 402, and generally has a rectangular configuration and includes an upper surface 508 and a lower surface 509. The upper surface 508 includes a lip 513, which is positioned around an outer rim 511 of the base 502. In some embodiments, the lip 513 extends along the three edges of the base 502, and terminates at the grease trap. The lip 513 is configured to prevent any liquid or grease, which may escape the cooking plate 504, from entering the base 402 and directly contacting the heating element 516 within the base 502. The lip 513 can be integral with the upper surface 508, or can be attached separately to the upper surface 508.

Figure 31:
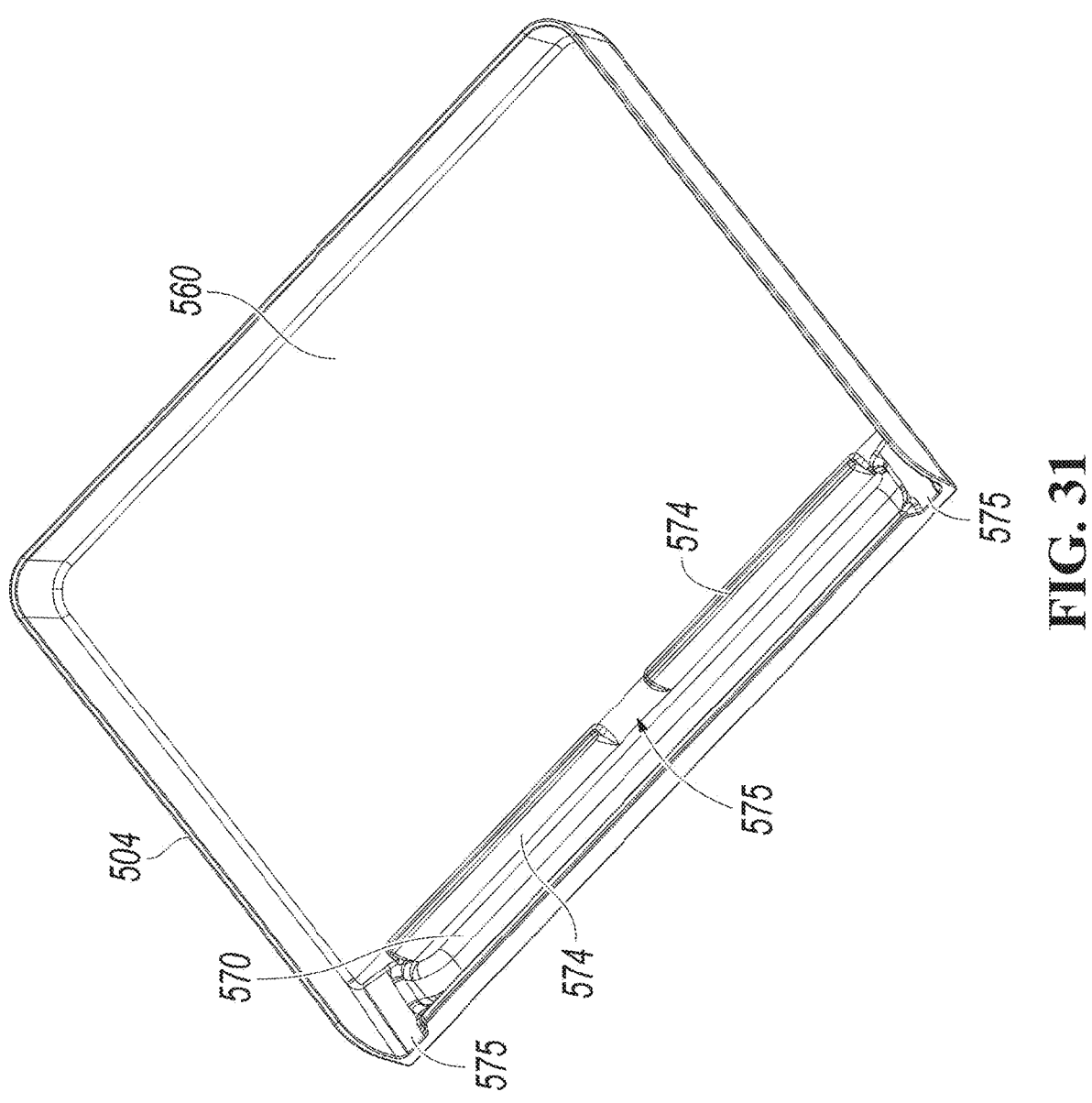
FIG. 31 is a front perspective view of a cooking plate of the cooking device of FIG. 29 removed from the cooking device.
Figure 32:
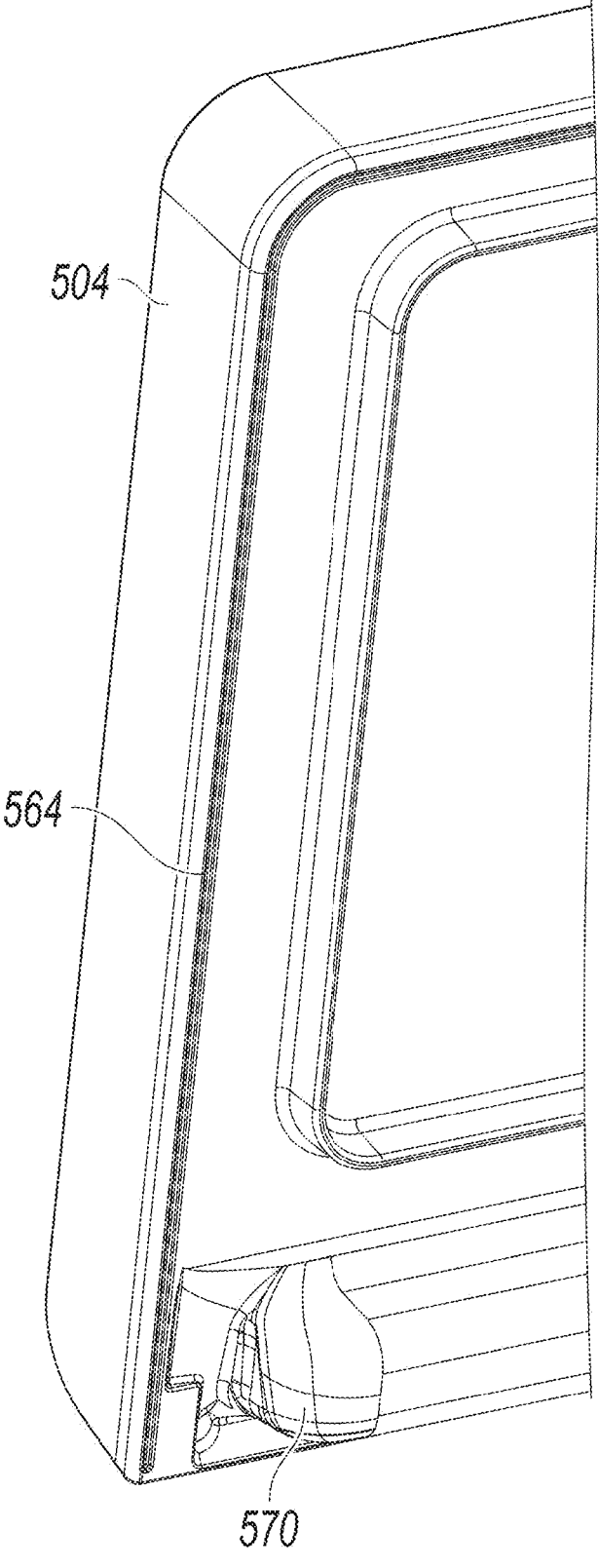
FIG. 32 is a partial bottom perspective view of the cooking plate of FIG. 31.

As stated above, the base 502 is configured to support the cooking plate 504 such that the heating element 516 can produce heat to the cooking plate 504. The cooking plate 504 is similar to the cooking plates 104 and 404. As depicted in FIGS. 31-32, the illustrated cooking plate 504 is generally rectangular and is configured to rest on top of the base 502 in order to arrange the heating element 516 below the cooking surface 560. In some embodiments, the cooking surface 560 can include ribs arranged along the cooking surface 560. In some embodiments, the cooking surface 560 can be flat and not include ribs, as illustrated in FIG. 31. A lip 574 can be arranged on the front edge of the cooking plate 504, and it can be configured to help contain grease, fluids, and food particulates within the cooking plate 504. Arranged on either end of and in the middle of the lip 574 are channels 575, allowing a user to pour any particulates or fluids collected by the grease trap 570 from the cooking plate 504 during and after a cooking procedure.

Arranged on a bottom surface of the cooking plate 504 is a channel 564. The channel 564 is complementary to the lip 513, and extends along the outer perimeter of the cooking plate 504 along three edges, terminating at the grease trap 570. The channel 564 can be integral with the cooking plate 504. As shown in FIG. 33, the channel 564 would prevent grease from traveling along the bottom surface of the cooking plate 504 and into the base 502. The channel 564 forces any fluids or grease sliding along the cooking plate 504 to bead and drop down onto the upper surface 508 of the base 502. Once on the upper surface 508, the lip 513 would prevent the grease from contacting the heating element 516.

Figure 34:
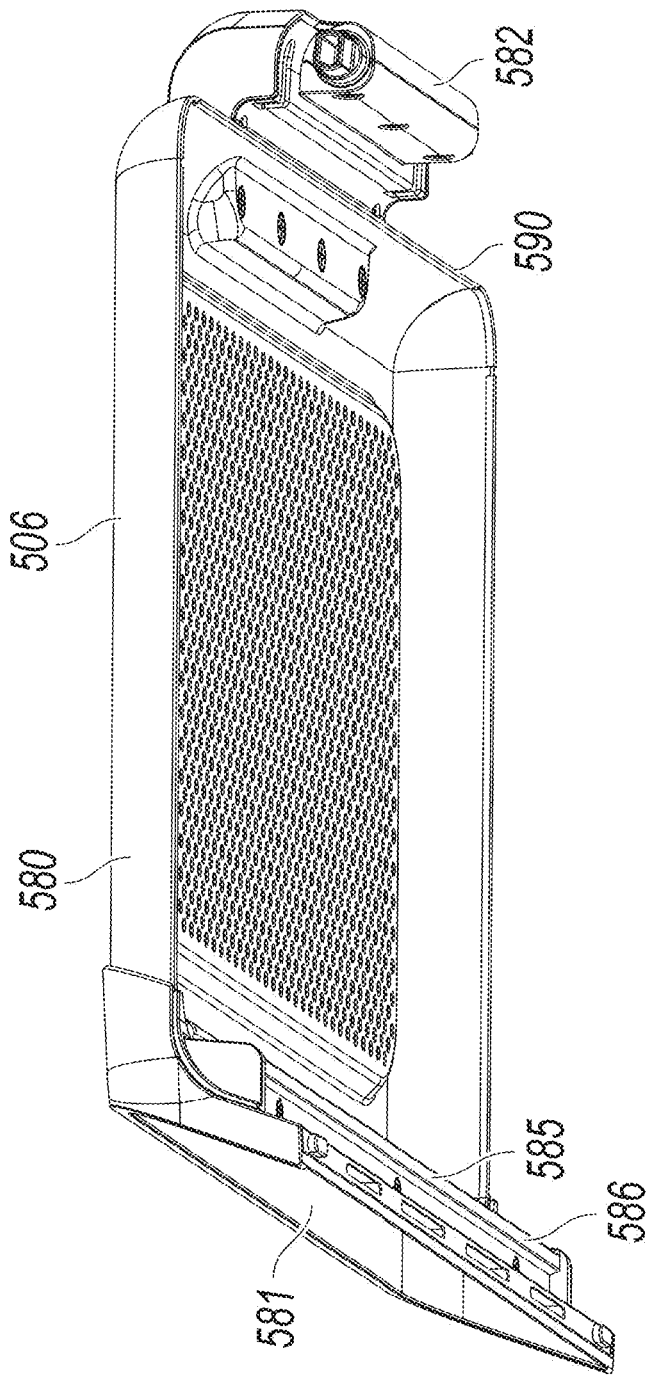
FIG. 34 is a bottom perspective view of the lid assembly of FIG. 29 removed from the cooking device.
Figure 35:
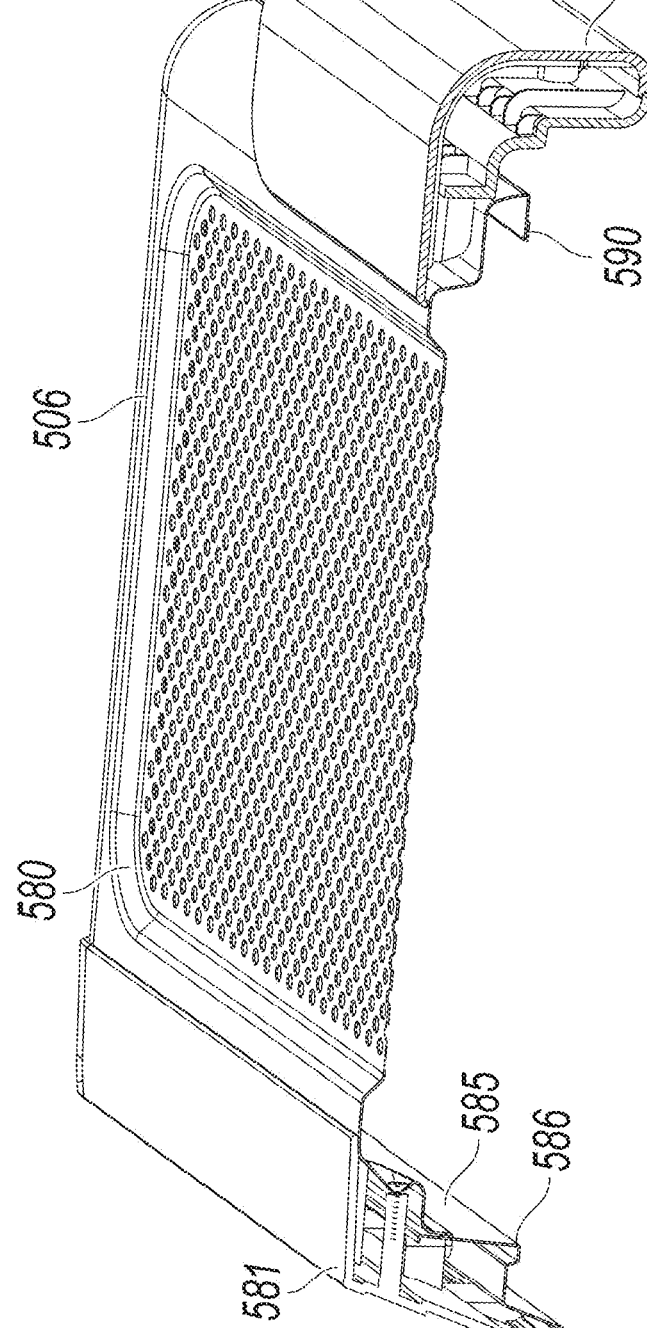
FIG. 35 is a perspective cross-sectional view of the lid assembly of FIG. 34.

A user may also desire to prevent food particles and fluids from escaping the cooking device 500 during the cooking process. As such, the lid assembly 506 can be provided on the base 502. The lid assembly 506 is similar to the lid assemblies 106 and 406. The lid assembly 506 can be removed from the base 502 similar to how the lid assembly 106 is removed from the base 102, described in detail above. As depicted in FIGS. 34-35, the lid assembly 506 can include a top cover plate 580, a front cover plate 581, and a bracket 582. The front cover plate 581 includes an internal surface 585 terminating at an edge 586, which is configured to direct splattering fluid and grease within the cooking device 500 into the grease trap 570. As shown in FIG. 33, the internal surface 585 is vertically arranged over the grease trap 570, allowing any fluids which contact the internal surface 585 to drip down and fall from the edge 586 to be collected within the grease trap 570.

In some embodiments, the top cover plate 580 includes a lip 590 extending from a rear edge of the top cover plate. As illustrated in FIGS. 33-35, the lip 590 extends outward horizontally from the top cover plate 580 along the whole width of the top cover plate 590. The lip 590 is vertically aligned with the cooking plate 504 when the lid assembly 506 is in a closed position, such that any grease of fluids that accumulate on the top cover plate 508 will run along the lip 590 and fall into the cooking plate 504. Additionally, the lip 590 collects any fluids which can run down the top cover plate 580 when the cover assembly 506 is in an open position.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A cooking device, comprising:
a base including an interior volume formed from a first recessed cavity and a second recessed cavity arranged in a top surface;
a heating element positioned in the first recessed cavity of the base:
a dial positioned on the base and configured to rotate relative to the base;
a bracket movably arranged within the interior volume of the base;
a temperature sensor positioned on the bracket;
a cooking plate positioned on the top surface of the base and in contact with the temperature sensor, and including a grease trap formed therein, wherein the second recessed cavity is configured to receive the grease trap when the cooking plate is positioned on the base; and
a linkage extending from the dial to the temperature sensor underneath the grease trap, wherein rotational movement of the dial is mechanically translated to the temperature sensor through the linkage.

2. The cooking device of claim 1, wherein the bracket is configured to move vertically within the interior volume relative to the base.

3. The cooking device of claim 1, wherein the rotational movement of the dial is configured to alter a threshold temperature of the temperature sensor.

4. The cooking device of claim 1, wherein a gap is formed between the heating element and the cooking plate arranged on the base.

5. The cooking device of claim 1, wherein at least one spring member is positioned between the base and the bracket.

6. The cooking device of claim 1, further comprising a cover plate configured to be removably positioned over the cooking plate, the cover plate having a plurality of through-holes arranged therein.

7. The cooking device of claim 1, wherein the linkage includes a double universal pivot joint.

8. The cooking device of claim 1, wherein the temperature sensor remains in contact with the cooking plate at any rotational position of the dial.

9. The cooking device of claim 1, wherein the temperature sensor and bracket are vertically displaced when the cooking plate is positioned on the base.

10. A cooking device, comprising:

a housing having an interior volume formed from a first recessed cavity and a second recessed cavity, a cooking plate including a grease trap formed therein, and a rotatable dial;

a temperature sensor mounted on a moveable bracket arranged within the housing, the temperature sensor positioned in contact with a bottom surface of the cooking plate;

a heating element positioned in the first recessed cavity of the housing, and wherein the second recessed cavity is configured to receive the grease trap when the cooking plate is positioned on the housing; and a rotatable linkage including a double universal pivot joint extending from the dial to the temperature sensor underneath the grease trap.

11. The cooking device of claim 10, wherein a rotational movement of the dial is mechanically translated to the temperature sensor through the linkage.

12. The cooking device of claim 10, wherein a gap is formed between the heating element and the cooking plate arranged on the basehousing.

13. The cooking device of claim 10, wherein the rotational movement of the dial is configured to alter a threshold temperature of the temperature sensor, the threshold temperature corresponding to an activation temperature of the heating element.

14. The cooking device of claim 13, wherein the bracket is positioned vertically below the heating element.

15. The cooking device of claim 10, wherein the housing comprises a base and a cover plate rotatably connected to the base.

16. The cooking device of claim 15, wherein the cover plate is configured to be removably positioned over the cooking plate, the cover plate having a plurality of through-holes arranged therein.

17. The cooking device of claim 10, wherein at least one spring member is positioned between the housing and the bracket.

18. The cooking device of claim 10, wherein the temperature sensor is vertically displaced when the cooking plate is positioned on the housing.

* * * * *